(12) United States Patent
Miller et al.

(10) Patent No.: US 7,343,517 B2
(45) Date of Patent: Mar. 11, 2008

(54) SYSTEMS FOR MANAGING OF SYSTEM METADATA AND METHODS FOR RECOVERY FROM AN INCONSISTENT COPY SET

(75) Inventors: Wayne Eugene Miller, Livermore, CA (US); Frank Joseph Inzerillo, Livermore, CA (US)

(73) Assignee: Pillar Data Systems, Inc., San Jose, CA (US)

( * ) Notice: Subject to any disclaimer, the term of this patent is extended or adjusted under 35 U.S.C. 154(b) by 0 days.

(21) Appl. No.: 11/704,071

(22) Filed: Feb. 8, 2007

(65) Prior Publication Data

US 2007/0180316 A1    Aug. 2, 2007

Related U.S. Application Data

(63) Continuation of application No. 10/397,610, filed on Mar. 26, 2003, now Pat. No. 7,216,253.

(51) Int. Cl.
*G06F 11/00*    (2006.01)

(52) U.S. Cl. ............... 714/15; 714/5; 714/6; 711/162

(58) Field of Classification Search ............... 714/5, 714/6, 15
See application file for complete search history.

(56) References Cited

U.S. PATENT DOCUMENTS

| | | | |
|---|---|---|---|
| 5,390,327 A | 2/1995 | Lubbers et al. | |
| 5,724,501 A | 3/1998 | Dewey et al. | |
| 5,826,001 A * | 10/1998 | Lubbers et al. | 714/6 |
| 5,884,098 A | 3/1999 | Mason, Jr. | |
| 6,112,255 A | 8/2000 | Dunn et al. | |
| 6,161,192 A | 12/2000 | Lubbers et al. | |
| 6,182,123 B1 | 1/2001 | Filepp et al. | |
| 6,226,759 B1 * | 5/2001 | Miller et al. | 714/6 |
| 6,269,453 B1 | 7/2001 | Krantz | |

(Continued)

OTHER PUBLICATIONS

"Serial ATA" Wikipedia Online Encyclopedia. "SATA 3Gb/s." pp. 1-2.*

(Continued)

*Primary Examiner*—Robert Beausoliel
*Assistant Examiner*—Joseph D. Manoskey
(74) *Attorney, Agent, or Firm*—Robert Moll

(57) ABSTRACT

The present invention relates to a method of updating SMD in an array of storage devices. In an embodiment, the method employs an array controller to change the start tag values of a copy set X, write an updated SMD of the copy set X, change the end tag values of copy set X, change the value of X, and repeat the change and write steps above to generate multiple SMD copies on each storage device. In another embodiment, the method updates the SMD in an array of SATA storage devices. In another embodiment, the invention is a data storage system, including at least one host, a plurality of storage nodes coupled to the host(s), where each storage node includes an array controller coupled to an array of storage devices and each storage device includes one or more copies of the SMD, and a system for managing SMD on each storage device. Another feature of the invention is the copying of SMD in all of the storage devices of a data storage system to increase the probability that a map for the data can be recovered.

9 Claims, 21 Drawing Sheets

U.S. PATENT DOCUMENTS

| | | | |
|---|---|---|---|
| 6,301,605 B1 | 10/2001 | Napolitano et al. | |
| 6,427,204 B1 | 7/2002 | Arimilli et al. | |
| 6,480,970 B1 | 11/2002 | DeKoning et al. | |
| 6,591,351 B1* | 7/2003 | Urabe et al. | 711/162 |
| 6,907,507 B1* | 6/2005 | Kiselev et al. | 711/162 |
| 6,988,171 B2* | 1/2006 | Beardsley et al. | 714/6 |
| 7,010,528 B2* | 3/2006 | Curran et al. | 707/8 |
| 7,032,125 B2* | 4/2006 | Holt et al. | 714/6 |
| 7,136,867 B1* | 11/2006 | Chatterjee et al. | 707/102 |
| 2002/0133491 A1 | 9/2002 | Elm et al. | |
| 2002/0161855 A1 | 10/2002 | Manczek et al. | |
| 2002/0174295 A1 | 11/2002 | Ulrich et al. | |
| 2003/0028726 A1* | 2/2003 | Gaertner et al. | 711/114 |

OTHER PUBLICATIONS

Marc Farley, Building Storage Networks, Copyright 2001, pp. 522-524, Second Edition, Osborne/McGraw Hill, Berkeley, CA, US.

* cited by examiner

| Start Tag | End Tag |
|---|---|
| 0 | 0 |

FIGURE 3A

| Start Tag | End Tag |
|---|---|
| 1 | 0 |

FIGURE 3B

| Start Tag | End Tag |
|---|---|
| 1 | 1 |

FIGURE 3C

SYSTEMS FOR MANAGING OF SYSTEM METADATA AND METHODS FOR RECOVERY FROM AN INCONSISTENT COPY SET

This application is a continuation of U.S. Application Ser. No. 10/397,610, entitled, Methods and Systems for Management of System Metadata, filed on Mar. 26, 2003, now U.S. Pat. No. 7,216,253 B2, which is incorporated by reference herein.

BACKGROUND

The present invention relates to the management of data storage systems.

Corporations, academic institutions, governments, and other organizations store data in data storage subsystems. Each data storage subsystem typically includes a RAID controller that distributes data in disk arrays. Storage area networks (SAN) and Network attached storage (NAS) enable these organizations to locate data storage subsystems remotely in global enterprises to facilitate disaster recovery. Thus, the technologies and how they are employed distribute the data on many storage devices.

Efficient disaster recovery requires an accurate map of the data. System metadata (SMD) provides a map so the data can be potentially retrieved. Because the map is so crucial for data recovery SMD must be carefully protected. The SMD must be also updated when the data storage system is reconfigured, for example, to add or delete storage devices. Updating must be also executed completely or not at all to ensure consistency in the data storage system. Thus, SMD updates have the potential to tie up the host and adversely affect the network performance until they are completed.

SUMMARY OF THE INVENTION

The present invention relates to methods and systems of managing data in data storage systems. In a method, an array controller writes updated SMD in storage devices 1-N. The array controller changes the start tag values of a copy set, writes the updated SMD of the copy set, changes the end tag values of the copy set, changes the copy set value and repeats the change and write steps above to generate SMD on each storage device. In another method, SMD is updated in each of an array of SATA storage devices stored in a plurality of storage nodes. The array controller changes the start tag values of a copy set, writes the updated SMD copies of the copy set and changes the end tag values of the copy set. In a system of managing SMD, the invention provides a data storage system, including a host, a plurality of storage nodes coupled to the host, where each storage node includes an array controller coupled to an array of storage devices and each storage device includes copies of the SMD, and a system for managing SMD on each storage device. In other aspects, the invention stores multiple copies of SMD in all of the storage devices of a data storage system to increase the probability that a map of the data can be recovered and in a manner that aids detection and correction of inconsistent copies of SMD. In other methods and systems, the invention uses similar techniques for managing data other than SMD.

BRIEF DESCRIPTION OF THE DRAWINGS

FIG. 3A illustrates tag values before an SMD update.
FIG. 3B illustrates tag values during an SMD update.
FIG. 3C illustrates tag values after an SMD update.

DETAILED DESCRIPTION OF THE PREFERRED EMBODIMENTS

The following description includes the best mode of carrying out the invention. The detailed description is made for the purpose of illustrating the general principles of the invention and should not be taken in a limiting sense. The scope of the invention is determined by reference to the claims. Each part is assigned its own part number throughout the specification and drawings.

Figure 1:
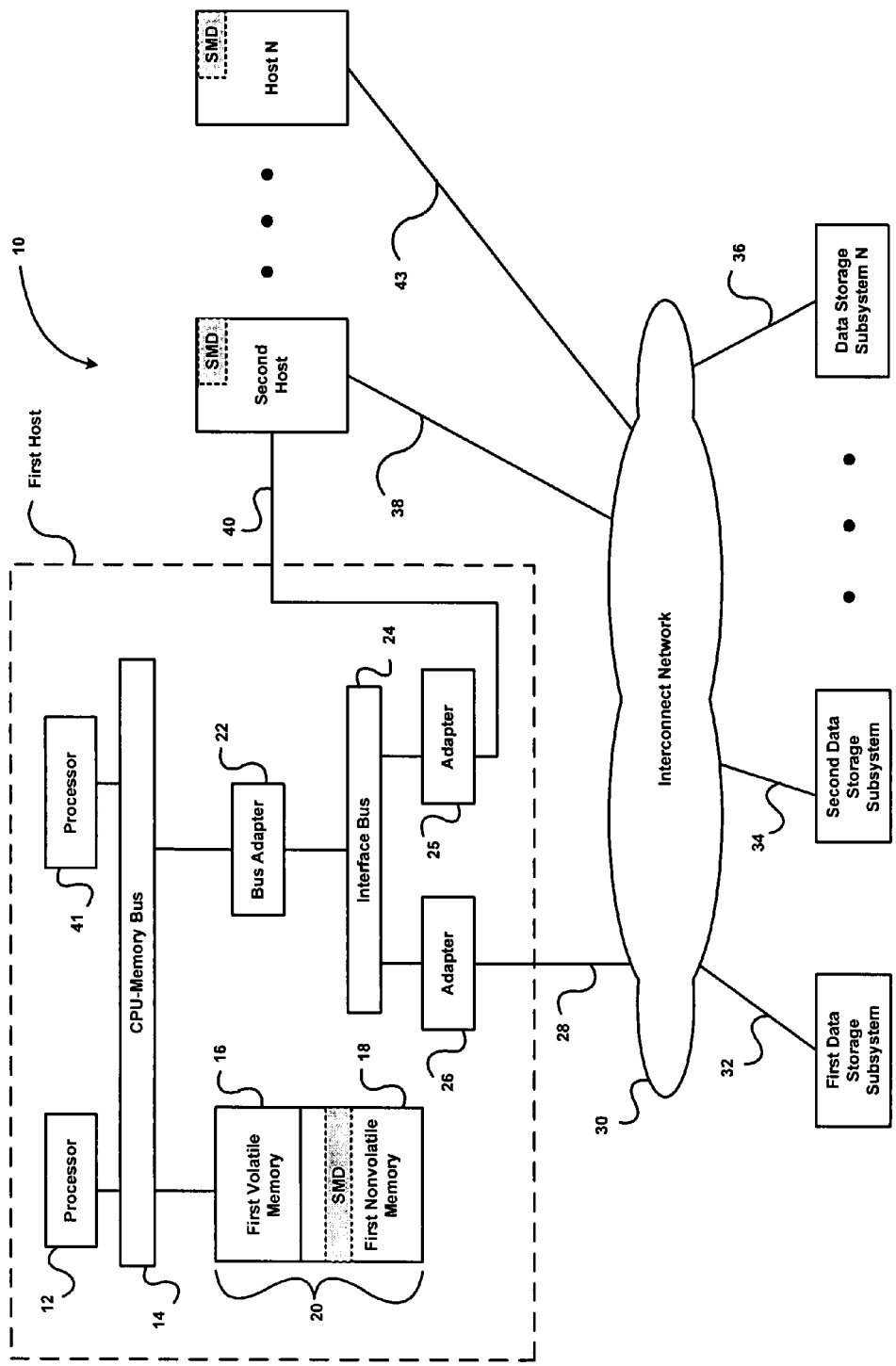
FIG. 1 illustrates a data storage system including hosts with nonvolatile memory for storing SMD.

FIG. 1 illustrates a data storage system 10, including a plurality of hosts coupled to data storage subsystem(s). Each host is a computer that can connect to client(s), to data storage subsystem(s), and each other. Each host provides software/hardware interfaces such as network interface cards and software drivers to implement Gigabit Ethernet, Ethernet, Fibre Channel, ATM, and SCSI, and Infiniband. Hennessy and Patterson, *Computer Architecture: A Quanti-* tative Approach (2003), and Patterson and Hennessy, *Computer organization and Design: The Hardware/Software Interface* (1998) describe computer hardware and software, storage systems, caching, and networks and are incorporated by reference.

In an embodiment, the first host includes a PC motherboard with a CPU-memory bus 14 that communicates with dual processors 12 and 41. The processor used is not essential to the invention and could be any suitable processor such as the Intel Pentium 4 processor. Also, one could implement the invention using a single processor in each host or more than two processors to meet more stringent performance requirements. The arrangement of the processors is not essential to the invention.

The first host memory 20 includes a first nonvolatile memory 18 and a first volatile memory 16. The first nonvolatile memory 18 protects data in the event of a power interruption or a host failure. Data is defined as including user data, instructions, and metadata. The nonvolatile memory may be implemented with a battery that supplies power to the DRAM to make it nonvolatile memory when a conventional external power interrupt circuit detects a power interruption or with a nonvolatile semiconductor memory.

Each host includes a bus adapter 22 between the CPU-memory bus 14 and an interface bus 24. Each host runs an operating system such as Linux, UNIX, a Windows OS, or another suitable operating system. Tanenbaum, *Modern Operating Systems* (2001) describes operating systems in detail and is hereby incorporated by reference. The first host is representative of the other hosts, but this feature is not essential to the invention.

The first host can communicate with the second host through an interconnect 40, shown as connected to an adapter 25 to the interface bus 24. The PCI bus is one suitable interface bus and the interconnect 40 may be any suitable known bus, SAN, LAN, or WAN technology. In an embodiment, the interconnect 40 is a dedicated Fibre Channel (FC) point-to-point link that connects to FC-PCI bus adapter 25 to provide fast point-to-point communication between the hosts.

In an alternative embodiment, the interconnect network 30 such as a FC fabric provides extra bandwidth for host-to-host communications. In this embodiment, links 28, 38 connect to the interconnect network 30 and the hosts use link 28 and link 38 when available. FC standard software can set priority levels to ensure high priority peer-to-peer requests but there will still be some arbitration overhead and latency in claiming ownership of the links. For example, if links 28 and 38 are busy transferring data when a write request arrives, that operation must complete before either link is free for arbitration.

If the interconnect 40 ever fails, communication between hosts can be handled using the interconnect network 30. The interconnect network 30 can be implemented by interconnects used in data storage systems such as Fibre Channel, SCSI, Infiniband, or Ethernet, and the type of interconnect is not essential to the invention. In either embodiment, redundant communication between hosts ensures the data storage system has high availability. See Clark, *IP SANs: A Guide to ISCSI, IFCP, and FCIP Protocols for Storage Area Networks* (2002) and Clark, *Designing Storage Area Networks* (1999) are incorporated herein by reference.

In an embodiment, the data storage subsystems shown in FIG. 1 can be those described in the co-pending U.S. patent application Ser. No. 10/264,603, entitled, Systems and Methods of Multiple Access Paths to Single Ported Storage Devices, filed on Oct. 3, 2002, and incorporated herein by reference. It is understood, however, that other storage device(s) or data storage subsystems could be used instead of the data storage subsystem described in that U.S. patent application.

As shown in FIG. 1, the first host connects, or couples, to the first data storage subsystem through the bus adapter 22, the interface bus 24, the adapter 26, the link 28, the interconnection network 30, and the link 32. To connect to the second data storage subsystem, the first host uses the same I/O path except the data passes through link 34, while the second host uses the same type of I/O components plus link 32 to communicate with the first data storage subsystem, or link 34 to communicate with the second data storage subsystem, or link 36 to the data storage subsystem N.

The first nonvolatile memory 18 of the first host contains the SMD. The second host also contains a copy of the SMD. In an embodiment, SMD contains a map of the data. In another embodiment, SMD contains a storage virtualization map of the data. A storage virtualization map is a map of data from the user perspective down to the physical storage devices. In another embodiment, the SMD includes a map of the data, the policy settings, and/or the network configuration (e.g., IP address, user list, passwords, access control, and share folder information). The data storage system will update the SMD when any of these attributes change.

Figure 2:
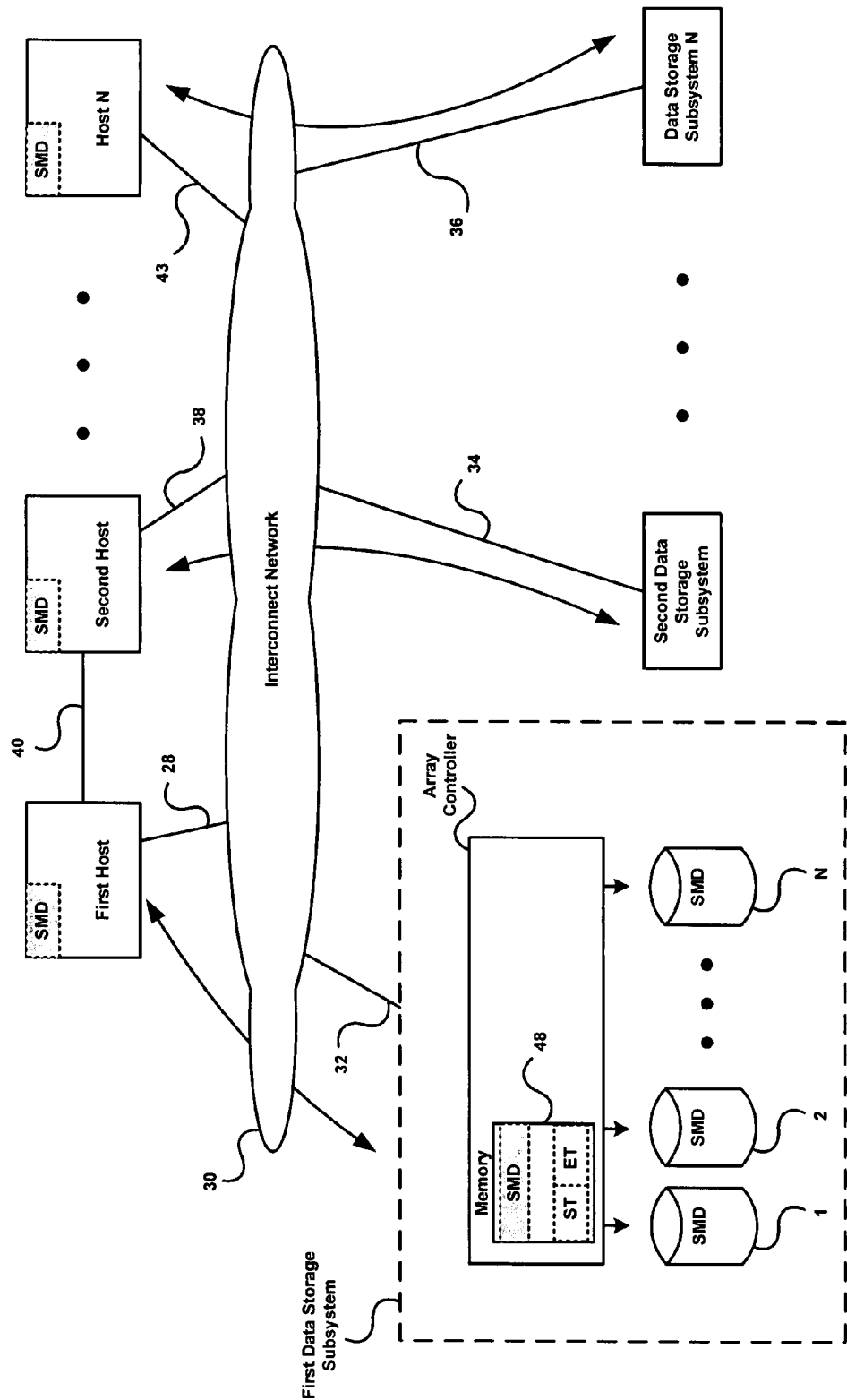
FIG. 2 illustrates an embodiment where hosts of the data storage system write copies of the SMD to the data storage subsystem(s).

FIG. 2 illustrates an embodiment where the host(s) of the data storage system write the SMD to the data storage subsystem(s). Any host can reach any data storage subsystem through the interconnect network 30.

In an embodiment, the first host can transfer the SMD in whole or in segments through the interconnect network 30 through the links 28 and 32 to the memory 48 in the first data storage subsystem. The SMD is written in segments when the size of the SMD exceeds the capacity of memory 48. The array controller manages the writing of SMD to each of the storage devices. The host need not know the physical storage device attributes, because it views the array of storage devices as a single logical device. The write operation is repeated for each data storage subsystem by host(s) 1-N initiating the operation.

In an alternative embodiment, the first host transfers each copy of the SMD through the link 28, the interconnect network 30, and the link 32 to the memory 48 of the first data storage subsystem. In this embodiment, the memory 48 functions as a buffer for the SMD and the host initiates the write to each of the storage devices 1-N. The host repeats the write operation until a copy of the SMD is stored in each storage device in each data storage subsystem.

In either embodiment, it is an advantage to write a copy of the SMD to each of the storage devices 1-N in each of the data storage subsystems 1-N to increase the probability that a copy of SMD will survive a disaster.

FIG. 3A-3C illustrates a set of tag values holding the start and end values used for checking the consistency of the SMD copies at various stages. These values are written to each storage device 1-N during the write operation of the SMD.

FIG. 3A illustrates that the tag values have a start value of "0" and an end value of "0". This indicates the associated SMD was successfully written. However, the start and end tag values need not be "0" or equal. They only need to match expected values indicating the SMD was successfully written.

FIG. 3B illustrates that the array controller changes (e.g., increments to "1") the start tag value to indicate that an SMD update is in process. However, the start tag value need not be "1". It only needs to indicate that the SMD update is in progress.

FIG. 3C illustrates that the array controller changes (e.g., increments to "1") the end tag value to equal the start tag value to indicate the SMD was successfully updated. However, the start and end tag values need not be "1" or equal. They only need to match expected values indicating the SMD was successfully updated.

Figure 4:
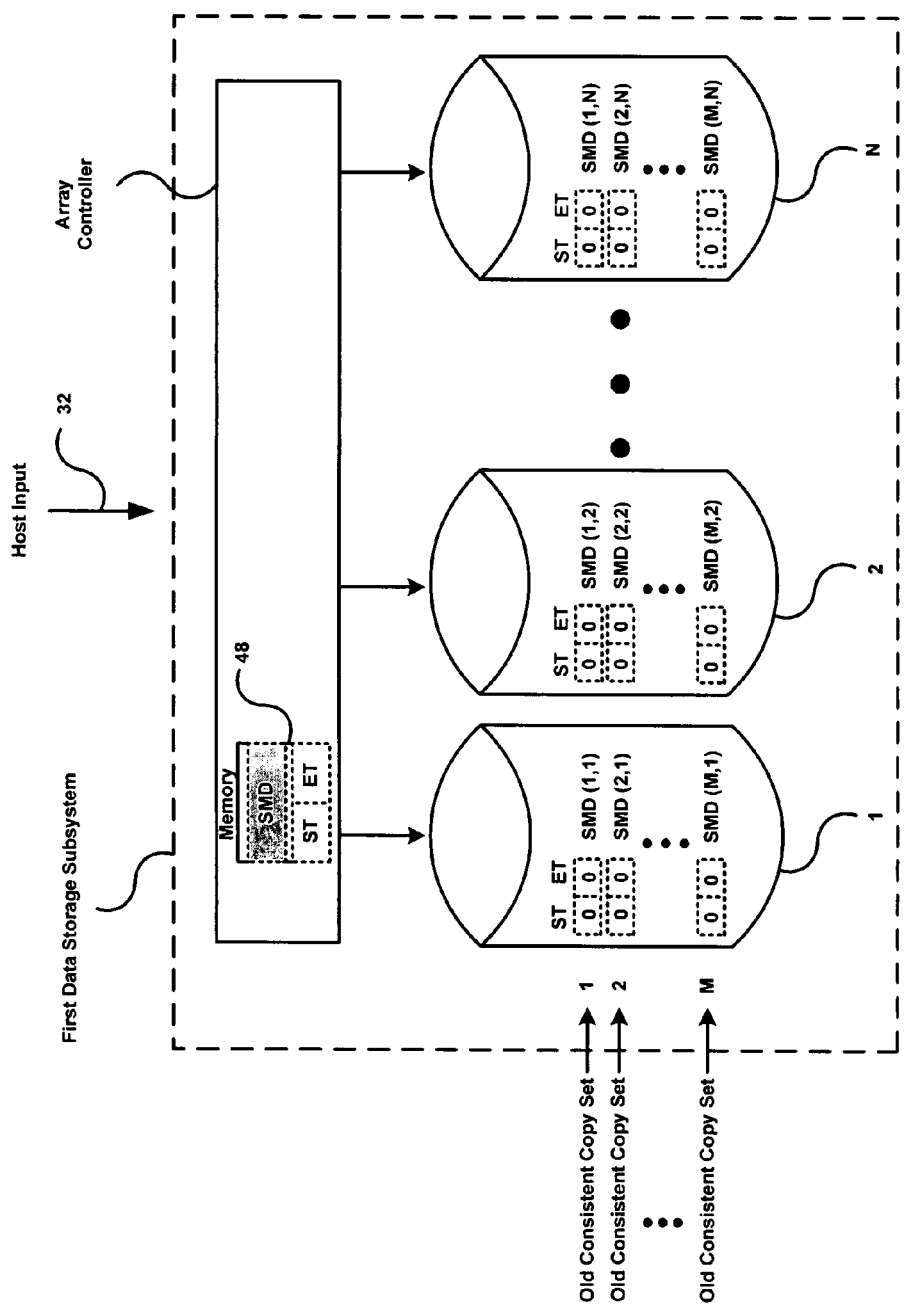
FIG. 4 illustrates the tag values before an update of the SMD copy sets.

FIG. 4 illustrates a first data storage subsystem including an array controller and an array of storage devices 1-N. The array controller accesses a memory 48 holding SMD and holding the tag values: start tag (ST) and end tag (ET). FIG. 4 illustrates that in an embodiment each of the storage devices 1-N contains multiple copies of SMD. Across a set of storage devices 1-N, there will be N copies of SMD, which define a copy set.

FIG. 4 illustrates an embodiment of ordered copy sets. SMD copy set 1 is labeled: SMD (1,1), SMD (1, 2) . . . SMD (1, N); the second SMD copy set is labeled: SMD (2, 1), SMD (2, 2) . . . SMD (2, N); and the last SMD copy set is labeled: SMD (M, 1), SMD (M, 2) . . . SMD (M, N).

Storage devices 1-N also include storage locations for 1-M copies of ST and ET. Each ST and ET indicates the status of their associated SMD copy. FIG. 4 shows ST and ET match for each copy of SMD, that is, they are consistent among all the copy sets in a storage node in the first data storage subsystem.

FIGS. 5-13 illustrate various embodiments of an SMD write operation for updating the SMD in a storage node having the storage devices 1-N. Each storage device contains M copies of the SMD so the storage node has N×M copies of SMD.

Figure 5:
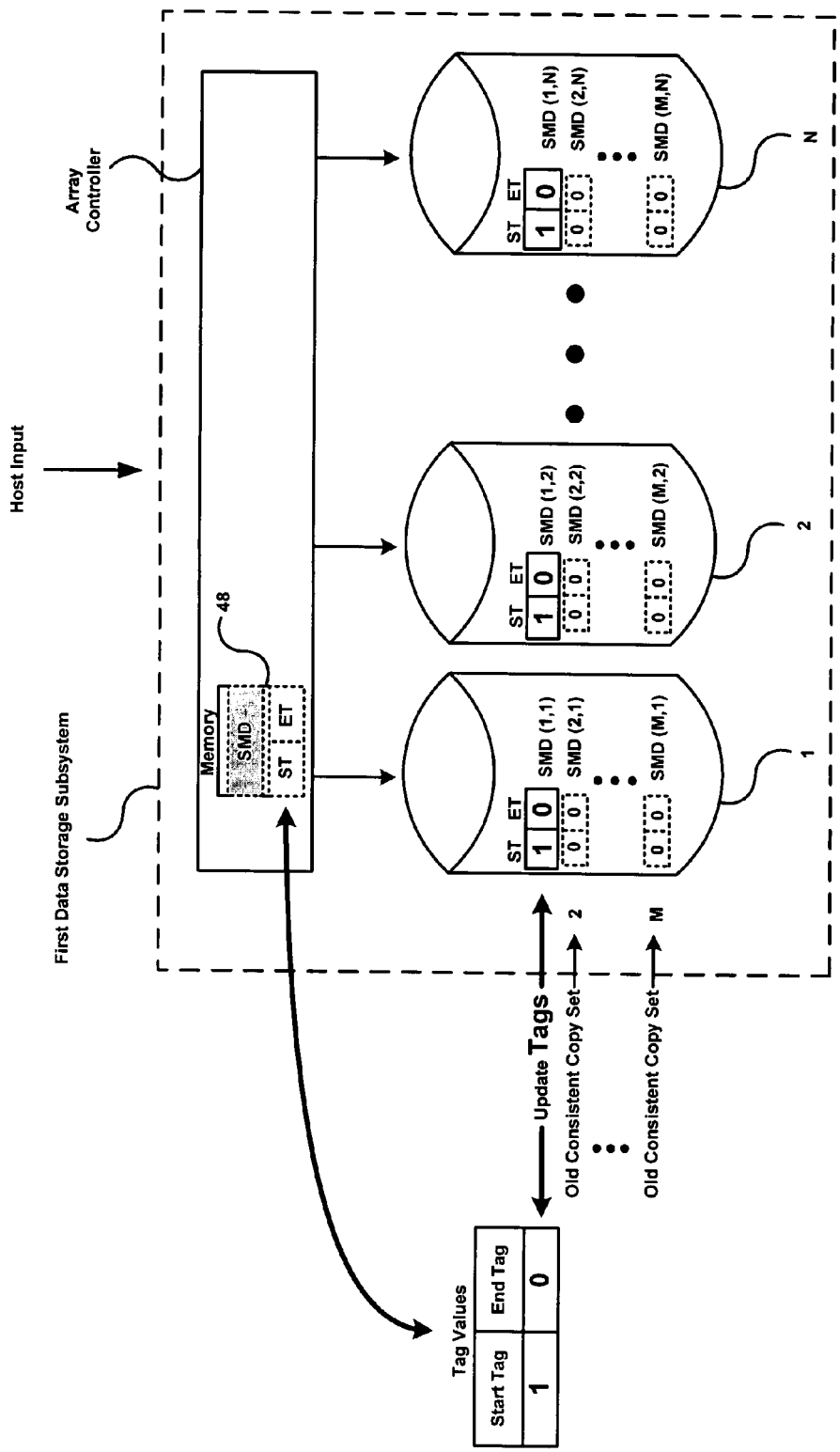
FIG. 5 illustrates the writing of the tag value(s) of the first copy set before copying the updated SMD on the storage devices in the first copy set.

FIG. 5 illustrates writing the tag value(s) for copy set 1 before writing the updated SMD to the storage devices 1-N. After receiving an SMD update request from a host, the array controller writes the updated SMD to the memory 48 for SMD copy set 1 and changes, e.g., increments, the value of ST in the memory 48. Next, the array controller writes the tag values (e.g., ST=1 and ET=0) from memory 48 to the storage devices 1-N for copy set 1. In an alternative embodiment, the array controller writes only the changed ST value (e.g., ST=1). The inequality of ST and ET illustrates one type of mismatch of expected values and that an SMD update is in process. If the write operation is interrupted due to a system or power failure, the inequality indicates SMD copy set 1 cannot be relied upon. In contrast, the equality or expected match of the tag values associated with the other SMD copy sets indicates they can be relied upon.

Figure 6:
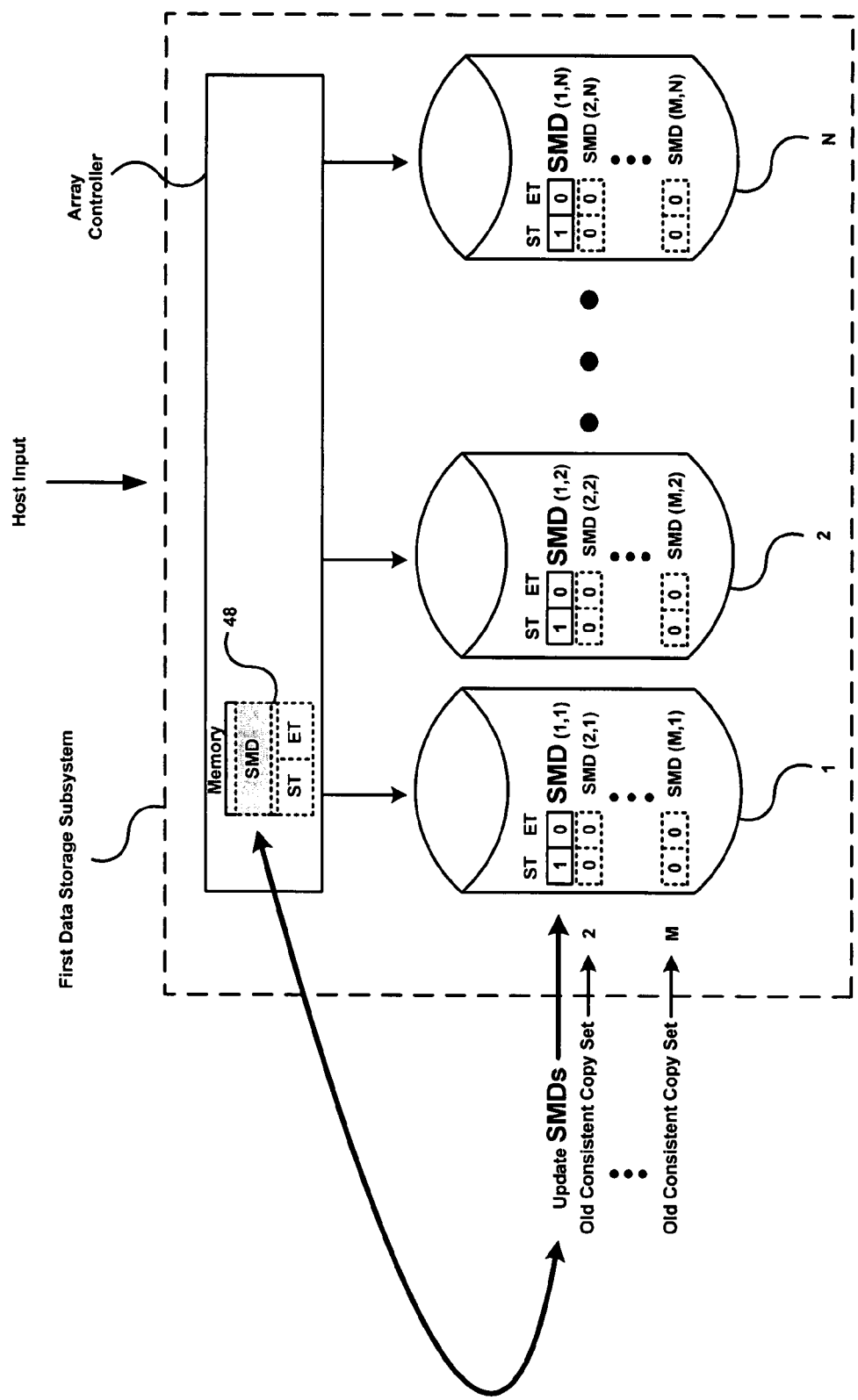
FIG. 6 illustrates copying the updated SMD in the first copy set.

FIG. 6 illustrates writing updated SMD for copy set 1. The array controller writes the SMD from the memory 48 to the storage devices 1-N: SMD (1, 1), SMD (1, 2) . . . SMD (1, N). SMD for copy set 1 is updated, but the inequality of the tag values indicates copy set 1 cannot be relied upon. In contrast, the equality of the tag values of the other SMD copy sets indicates that they can be relied upon.

Figure 7:
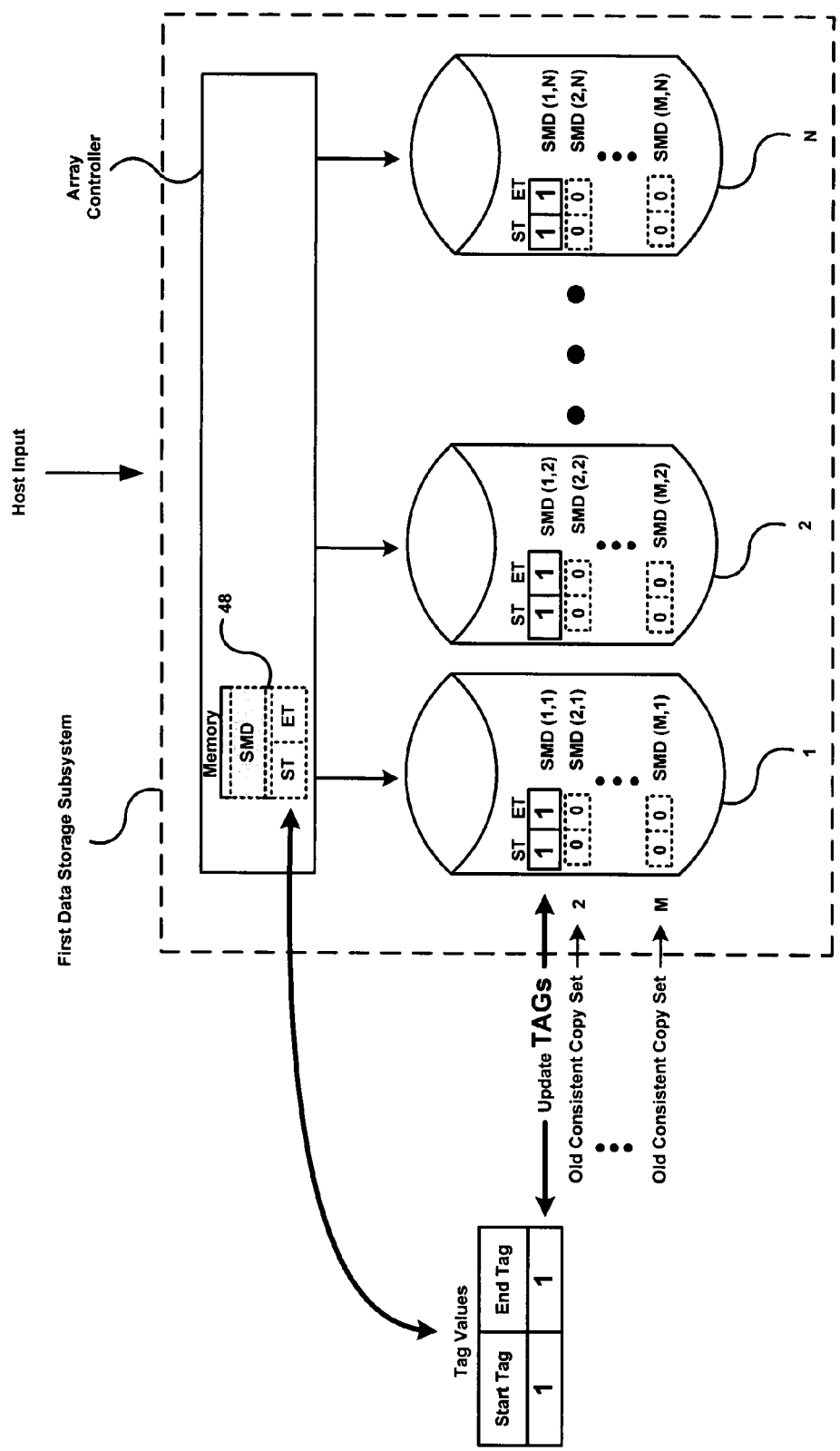
FIG. 7 illustrates the rewriting of the tag value(s) of the first copy set after copying the updated SMD in the first copy set.

FIG. 7 illustrates rewriting the tag values for copy set 1 after updating the SMD of copy set 1. The array controller changes, e.g., increments, the value of ET in the memory 48. In an embodiment, the array controller writes the tag values (e.g., ST=1 and ET=1) from memory 48 to the storage devices 1-N for copy set 1. In an alternative embodiment, the array controller writes only the changed ET value (e.g., ET=1). The equality of ST and ET indicates that the SMD update is complete for copy set 1. If the write operation is interrupted due to a system or power failure, the equality of tag values indicates that SMD copy set 1 can be relied upon.

Figure 8:
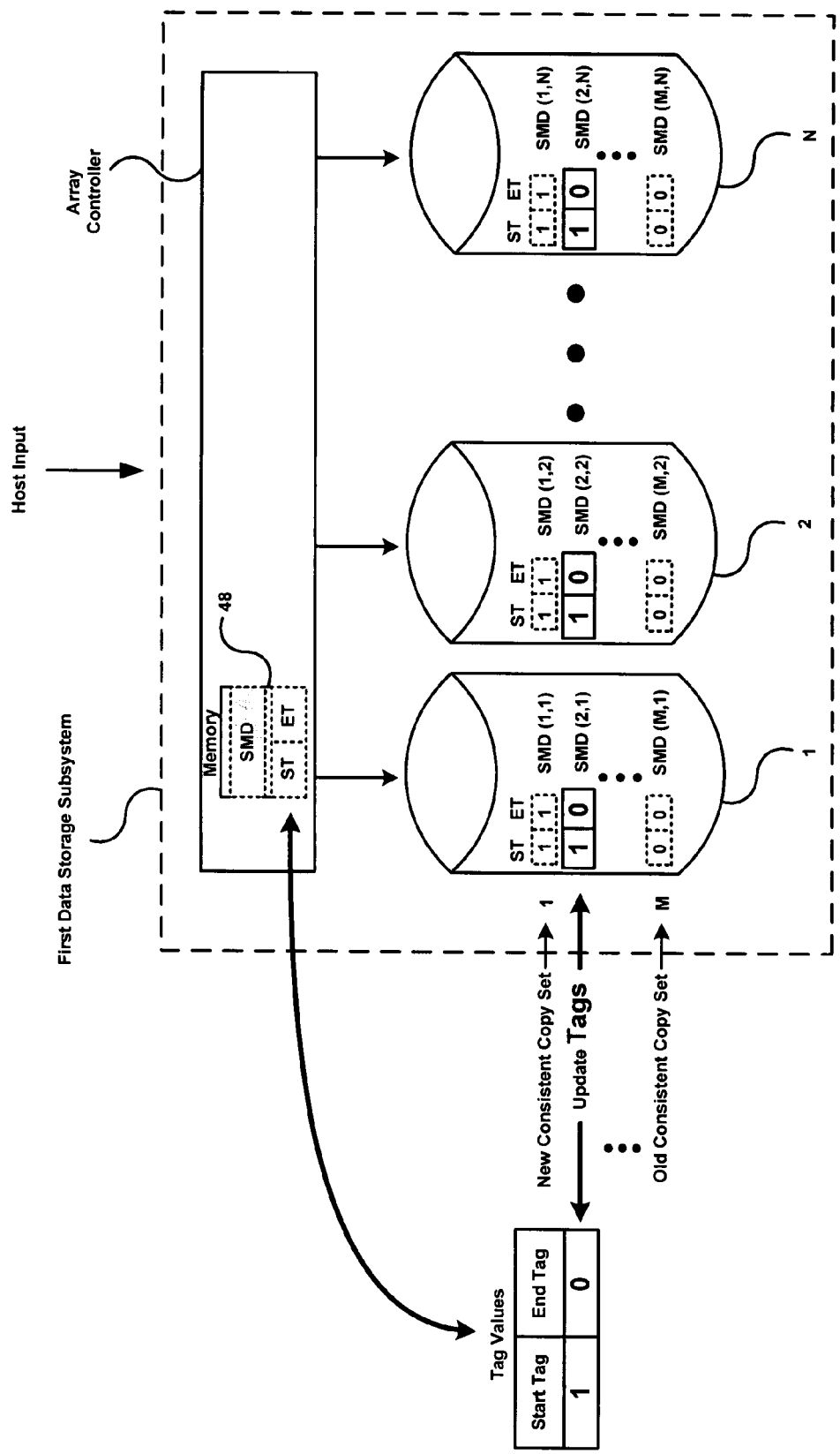
FIG. 8 illustrates the writing of the tag value(s) of the second copy set before copying the updated SMD on the storage devices in the second copy set.

FIG. 8 illustrates writing the tag values for copy set 2 before writing updated SMD to the storage devices 1-N. The array controller changes, e.g., increments, the value of ST in the memory 48 for copy set 2. Next, the array controller writes the tag values (e.g., ST=1 and ET=0) from memory 48 to the storage devices 1-N for copy set 2. In an alternative embodiment, the array controller writes only the changed ST value (e.g., ST=1). The inequality of ST and ET indicate an SMD update in process. If the write operation is interrupted due to a system or power failure, the inequality indicates that the SMD in copy set 2 cannot be relied upon. In contrast, the equality of tag values associated with the other SMD copy sets indicates that they can be relied upon.

Figure 9:
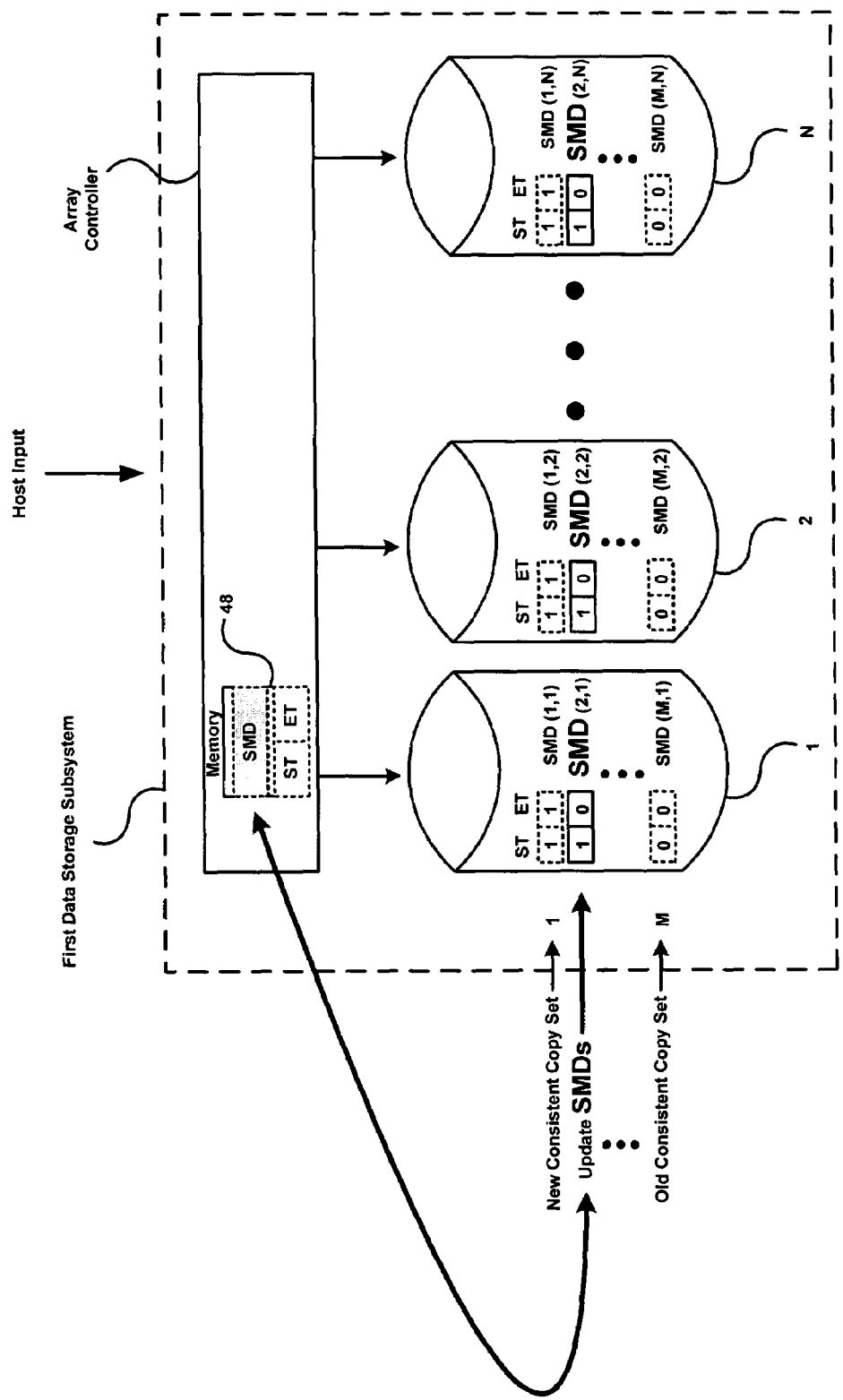
FIG. 9 illustrates copying the updated SMD in the second copy set.

FIG. 9 illustrates writing updated SMD for copy set 2. The array controller writes the SMD to the storage devices 1-N: SMD (2, 1), SMD (2, 2) . . . SMD (2, N). SMD for copy set 2 is now updated, but the inequality of the tag values indicates copy set 2 cannot be relied upon. In contrast, the equality of tag values of the other copy sets indicates that they can be relied upon.

Figure 10:
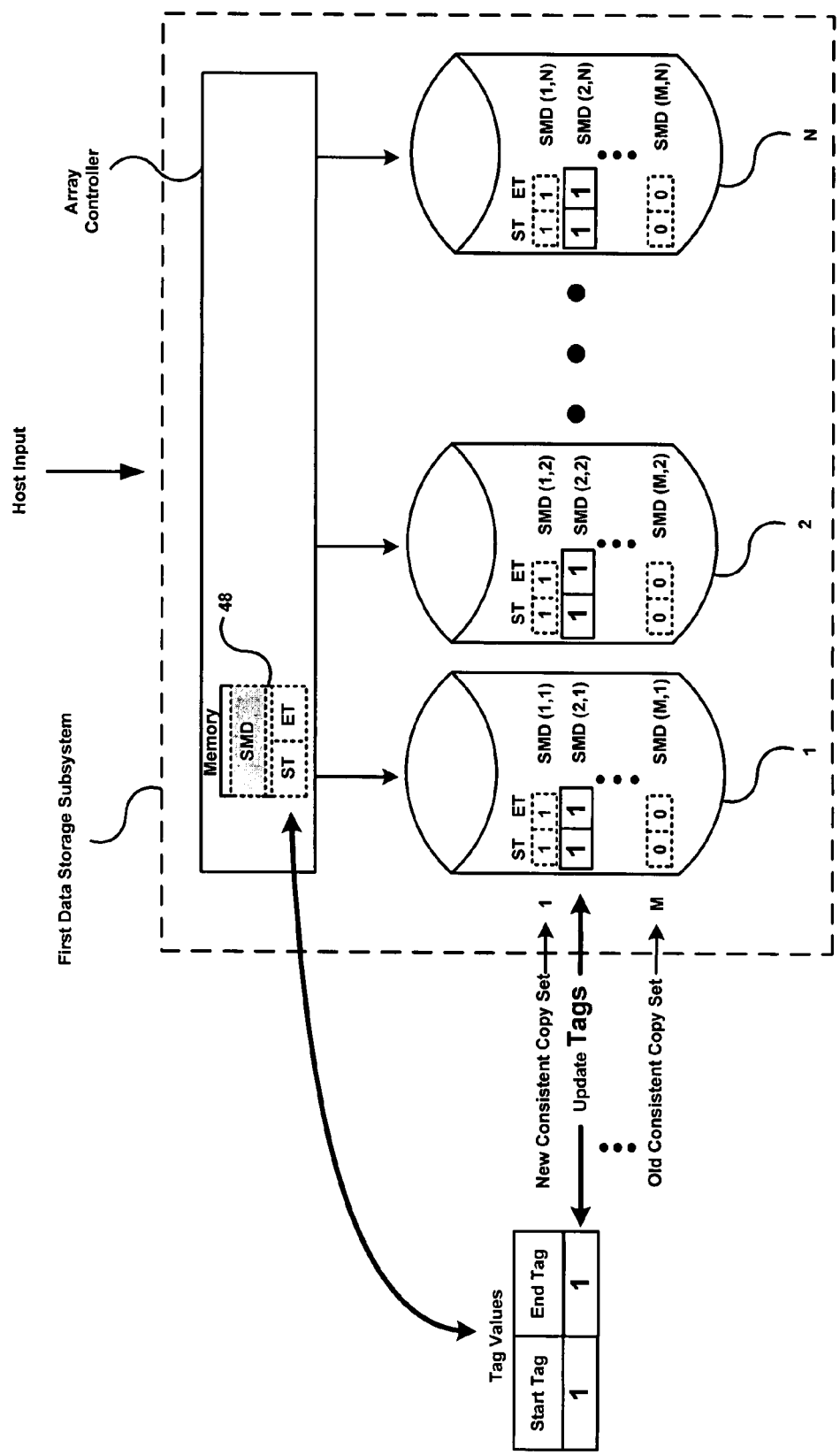
FIG. 10 illustrates the rewriting of the tag value(s) in the second copy set after successfully copying the updated SMD in the second copy set.

FIG. 10 illustrates rewriting the tag values for SMD copy set 2 after updating copy set 2. The array controller changes, e.g., increments, the value of ET in the memory 48. The array controller writes the tag values (e.g., ST=1 and ET=1) from memory 48 to the storage devices 1-N for copy set 2. In an alternative embodiment, the array controller writes only the changed ET value (e.g., ET=1). The equality of ST and ET indicates that the SMD update is complete for copy set 2. If the write operation is interrupted due to a system or power failure, the equality of tag values indicates that SMD copy set 2 can be relied upon.

Figure 11:
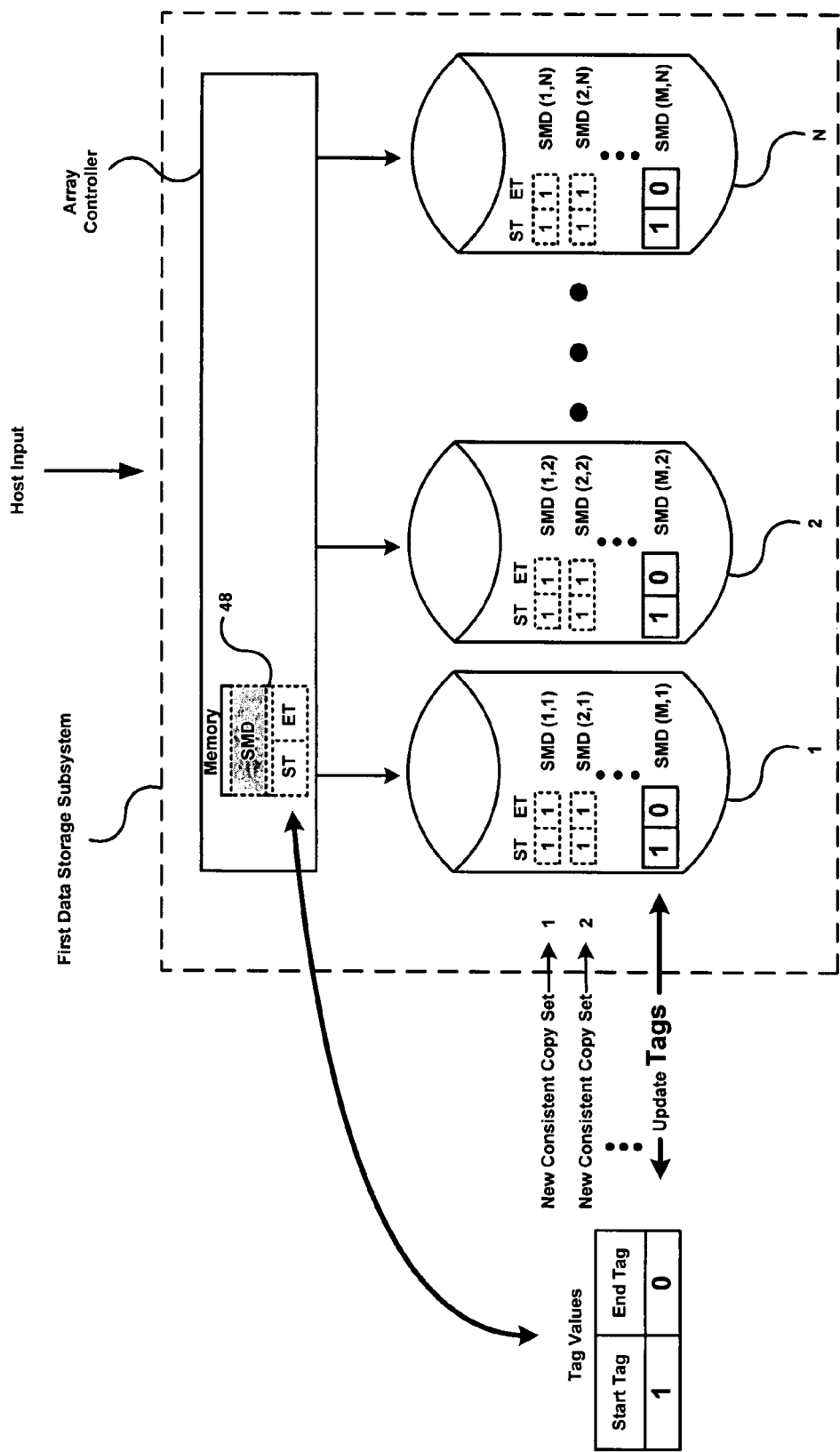
FIG. 11 illustrates the writing of the tag value(s) in the last copy set before copying the updated SMD on the storage devices in the M copy set.

FIG. 11 illustrates writing the tag values for the last copy set, that is, copy set M before copying the updated SMD to the storage devices 1-N. The array controller changes, e.g., increments, the value of ST in the memory 48. Next, the array controller writes the tag values (e.g., ST=1 and ET=0) from memory 48 to the storage devices 1-N for copy set M. In an alternative embodiment, the array controller writes only the changed ST value (e.g., ST=1). The inequality of ST and ET indicates that an SMD update is in process. If the write operation is interrupted due to a system or power failure, the inequality indicates that the SMD in copy set M cannot be relied upon. In contrast, the equality of tag values of the other SMD copy sets indicates that they can be relied upon.

Figure 12:
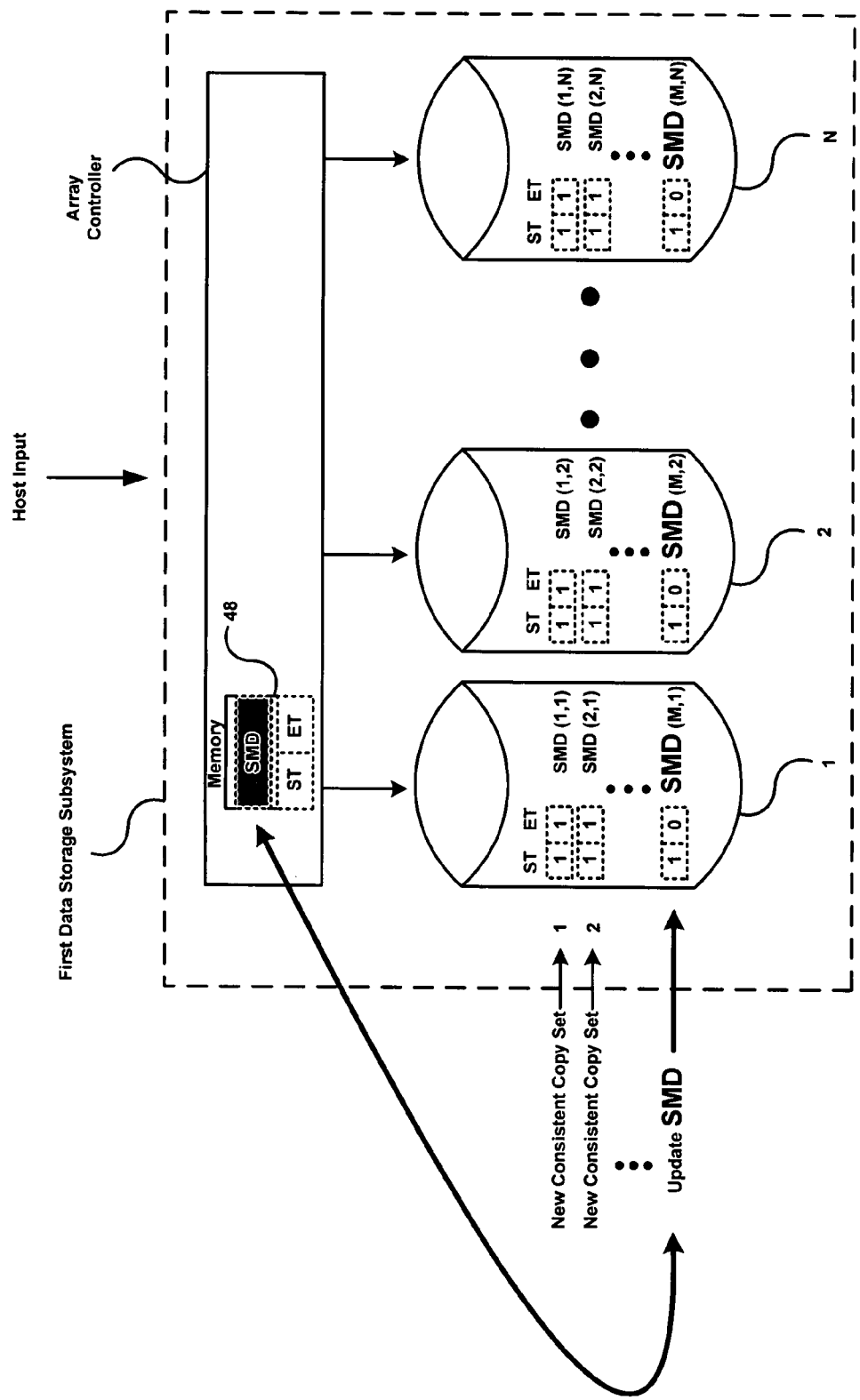
FIG. 12 illustrates copying the updated SMD in the last copy set.

FIG. 12 illustrates writing updated SMD for copy set M. The array controller writes the SMD to storage devices 1-N: SMD (M, 1), SMD (M, 2) . . . SMD (M, N). The SMD is now updated for copy set M, but unequal tag values indicate copy set M is unreliable. The equal tag values of the other SMD copy sets indicate they can be relied upon.

Figure 13:
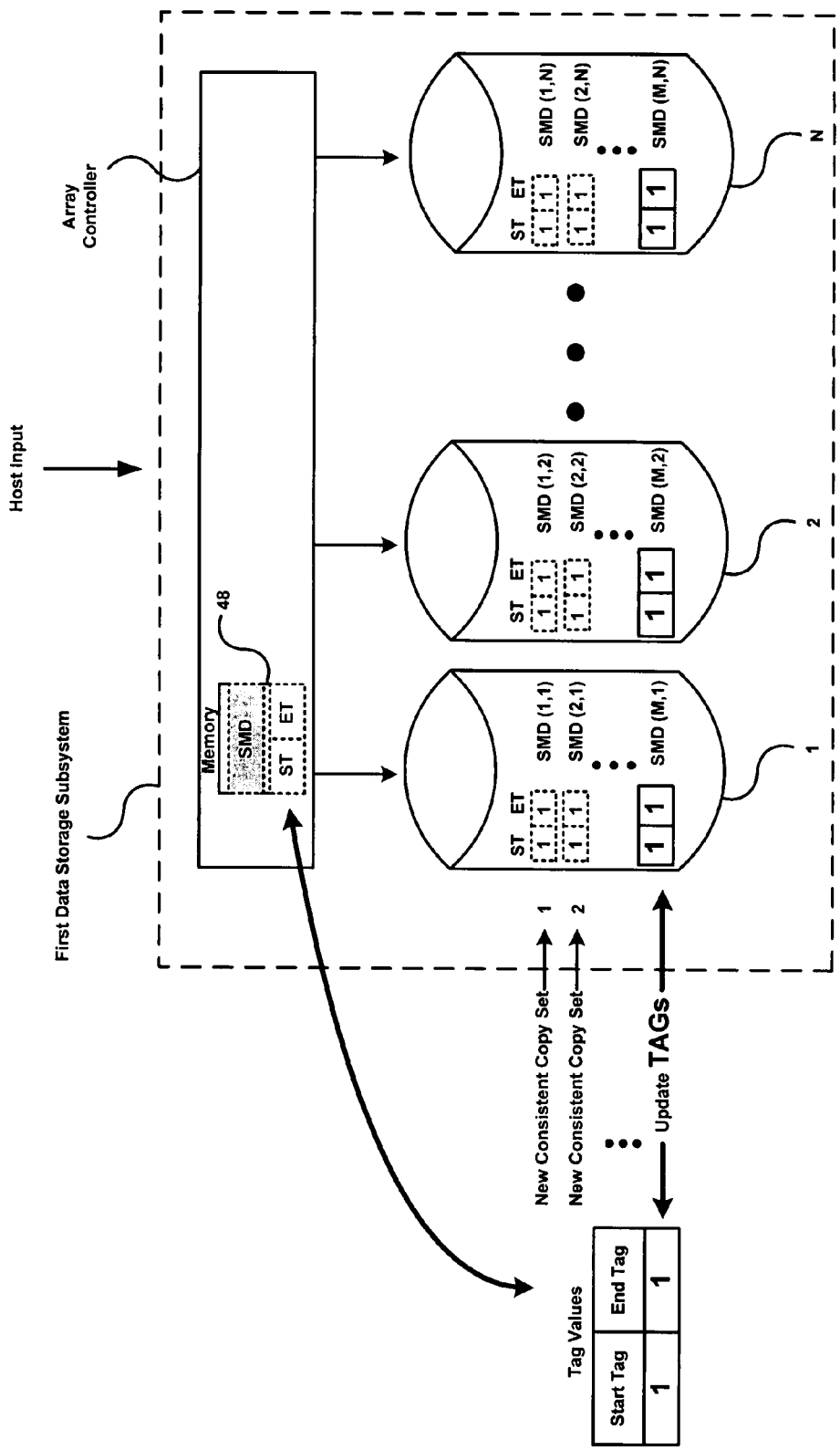
FIG. 13 illustrates the rewriting of the tag value(s) in the M or last copy set after copying the updated SMD in the M or last copy set.

FIG. 13 illustrates rewriting the tag values for copy set M after updating copy set M. The array controller changes, e.g., increments, the value of ET in the memory 48. The array controller writes the tag values (e.g., ST=1 and ET=1) from memory 48 to the storage devices 1-N for copy set M. In an alternative embodiment, the array controller writes only the changed ET value (e.g., ET=1). The equality of ST and ET indicates the SMD is updated for copy set M. If the write operation is interrupted due to a system or power failure, the equality indicates SMD copy set M is reliable.

Figure 14:
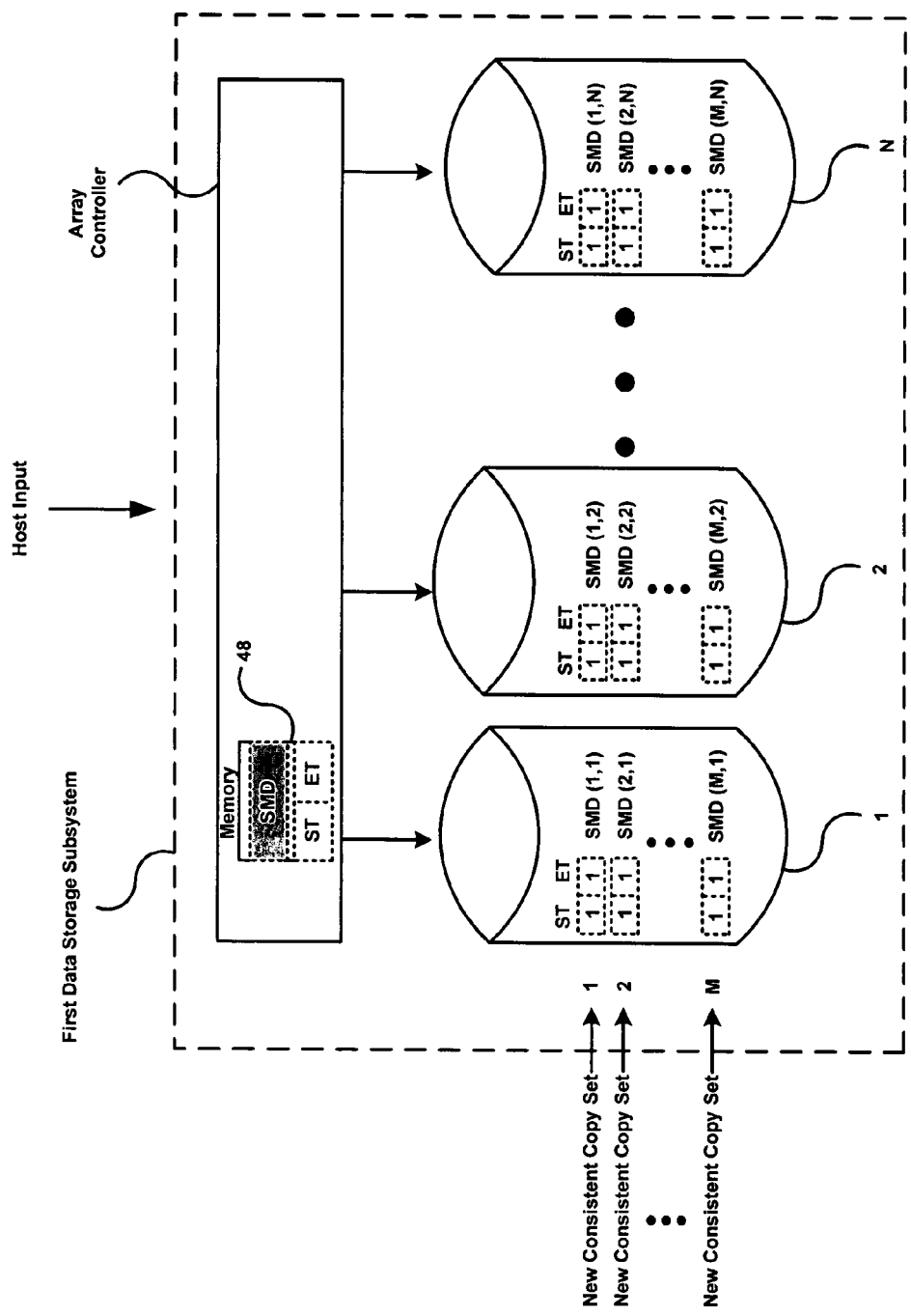
FIG. 14 illustrates the state of the tag values after updating all of the copy sets.

FIG. 14 shows that ST=1 and ET=1 for each copy of SMD in the storage devices indicating the consistency among all of the new or updated SMD in the storage node in the first data storage subsystem.

Figure 15:
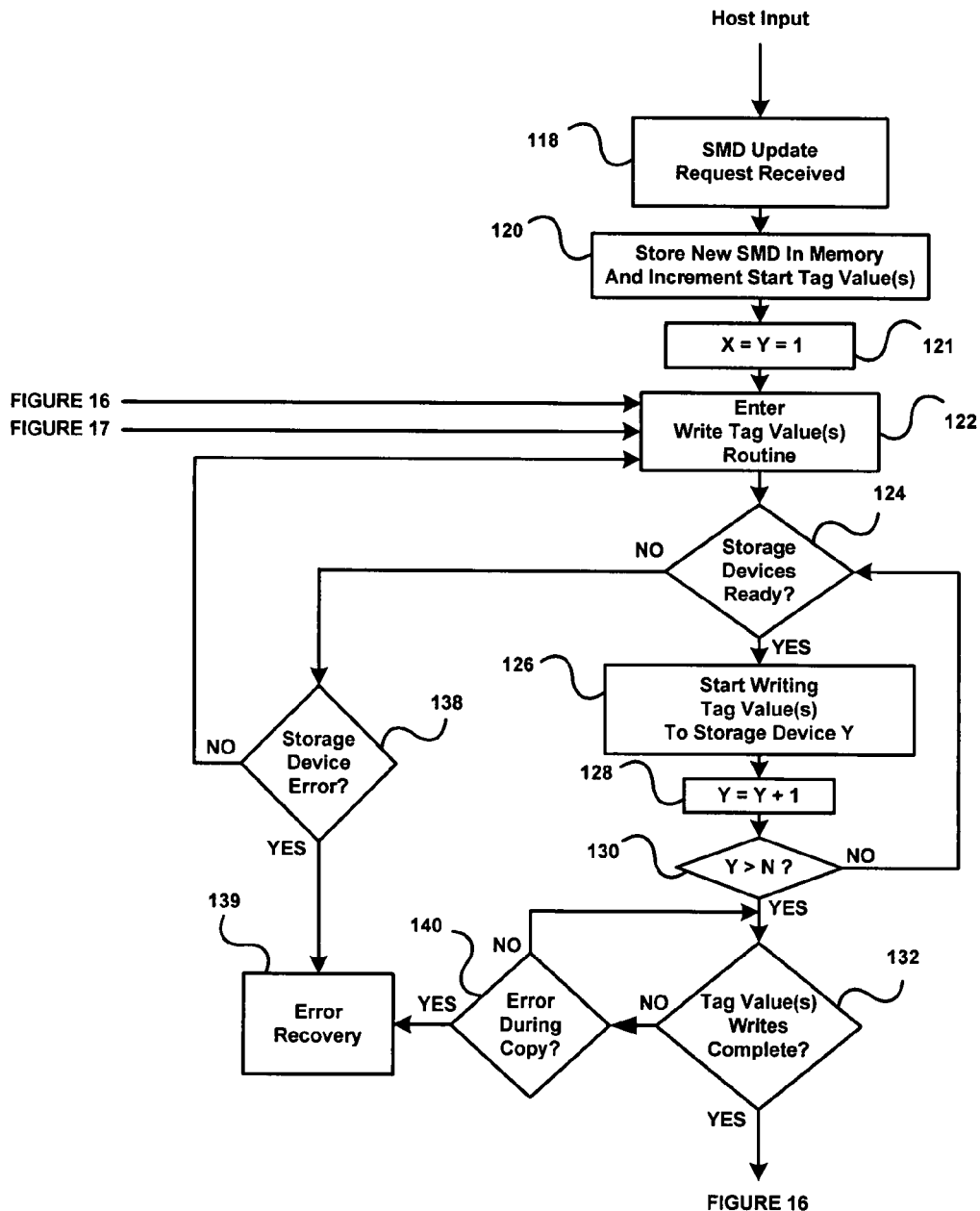
FIG. 15 is a flow chart of the write operation for the start tag values.

FIG. 15 is a flow chart of the write operation for the start tag value(s). This write operation is also illustrated in FIGS.

5, 8 and 11. In step 118, the array controller receives an SMD update request from any of the hosts 1-N. In step 120, the array controller writes the updated SMD to the memory 48 and increments the start tag value in the memory 48. In step 121, the array controller initializes the variables X and Y, that is, sets the variables: X=1 and Y=1, respectively, to start at copy set 1 and storage device 1. In step 122, the array controller enters the write tag value routine. In step 124, the array controller checks the readiness of storage devices 1-N for writing the tag value(s). In step 126, the array controller writes the tag value(s) to the storage device 1. In step 128, the array controller increments the value of Y. In step 130, the array controller tests if the value of Y is greater than N, that is, the last storage device. Since Y=1 the array controller will return to step 124. Assuming storage device 2 is ready the array controller writes the tag value(s) to storage device 2 in step 126. In step 128, the array controller increments the value of Y. In step 130, the array controller tests if the value of Y is greater than N, that is, the last storage device. Since Y=2 the array controller returns to step 124. Assuming storage device N is ready the array controller writes the tag value(s) to the storage device N. In step 128, the array controller increments the value of Y. In step 130, the array controller tests if the value of Y is greater than N, that is, the last storage device. This repeats until Y>N where the array controller goes to step 132. In step 132, the array controller checks if the tag value(s) are completely written to all storage devices 1-N. If complete, the array controller proceeds to step 51 in the routine shown in FIG. 16, and discussed below. If not complete, in step 140 the array controller checks if there is a storage device error. If not, the array controller returns to step 132 to wait for the storage devices to complete the writing of the tag value(s). If there is an error, the array controller goes to step 139 to run a standard error recovery procedure. Referring back to step 124 if the array controller determines the storage devices are not ready, the array controller goes to step 138 to check for a storage device error. If no error, the array controller returns to the write tag value(s) routine in step 122. If there is an error, the array controller returns to step 139 to run a standard error recovery procedure. In an alternative embodiment, in step 120 the array controller changes the tag value(s) by constant value(s) other than the illustrative value of an integer of one. In another embodiment, the array controller writes the tag value(s) to whichever storage device 1-N is first available, then next available, and so forth.

Figure 16:
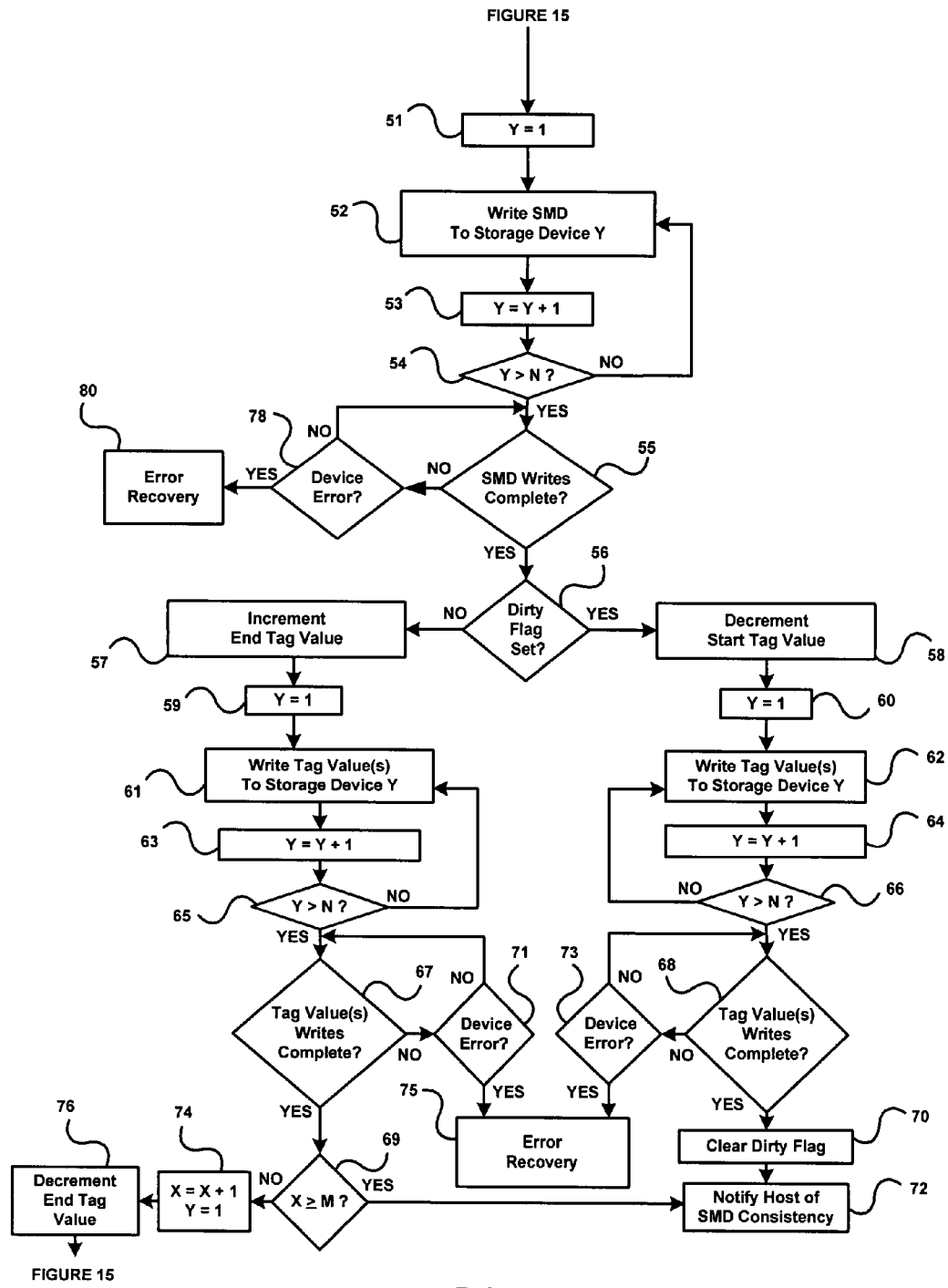
FIG. 16 is a flow chart of the SMD write operation and rewrite of the tag value(s).

FIG. 16 is a flow chart of the SMD write operation and the rewrite of tag value(s) after copying the updated SMD. This is also shown in FIGS. 6-7, 9-10 and 12-13. In step 51, the array controller initializes variable Y, that is, by setting variable Y=1. In step 52, the array controller writes updated SMD to the storage device 1. In step 53, the array controller changes, e.g., increments Y, that is, Y=Y+1. In step 54, the array controller tests if the value of Y is greater than N, that is, the last storage device. Since Y=2 the array controller returns to step 52 where the array controller writes the updated SMD to the storage device 2. In step 53, the array controller again increments the value of Y. This loop continues until Y is greater than N. If SMD is not completely written to storage devices 1-N in step 55, the array controller tests for storage device error in step 78. If no error, the array controller returns to step 55. If error exists, the array controller goes to an error recovery routine in step 80. If SMD is completely written to all storage devices 1-N in step 55, the array controller checks if the dirty flag is set in step 56. A dirty flag indicates inconsistency in copy set 1. The detailed description below (FIG. 17) discusses the dirty flag as it relates to the consistency check routine. In step 57, if the dirty flag is not set the array controller changes, e.g., increments the end tag value. In step 59, the array controller initializes the variable Y, that is, sets the variable Y=1. In step 61, the array controller writes the tag value(s) to the storage device 1. In step 63, the array controller changes, e.g., increments Y, that is, Y=Y+1. In step 65, the array controller tests if the value of Y is greater than N, that is, the last storage device. Since Y=2 the array controller returns to step 61 and writes the tag value(s) to storage device 2. In step 63, the array controller increments the value of Y. This loop continues until Y is greater than N in step 65. If the tag value(s) are not completely written to all storage devices 1-N in step 67, the array controller tests for a storage device error in step 71. If there is an error, the array controller goes to error recovery in step 75. If no error, the array controller returns to step 67. If storage devices are complete, the array controller tests for X≧M in step 69. If yes, the array controller notifies the host of SMD consistency. If no, in step 74, the array controller increments X, that is, X=X+1 and initializes Y, that is, Y=1. In step 76, the array controller decrements the end tag value in preparation for the next copy set, that is, copy set 2.

The array controller will write the tag values and SMD for copy set 2 through copy set M in the same manner as discussed earlier in connection with FIGS. 15-16.

Figure 17:
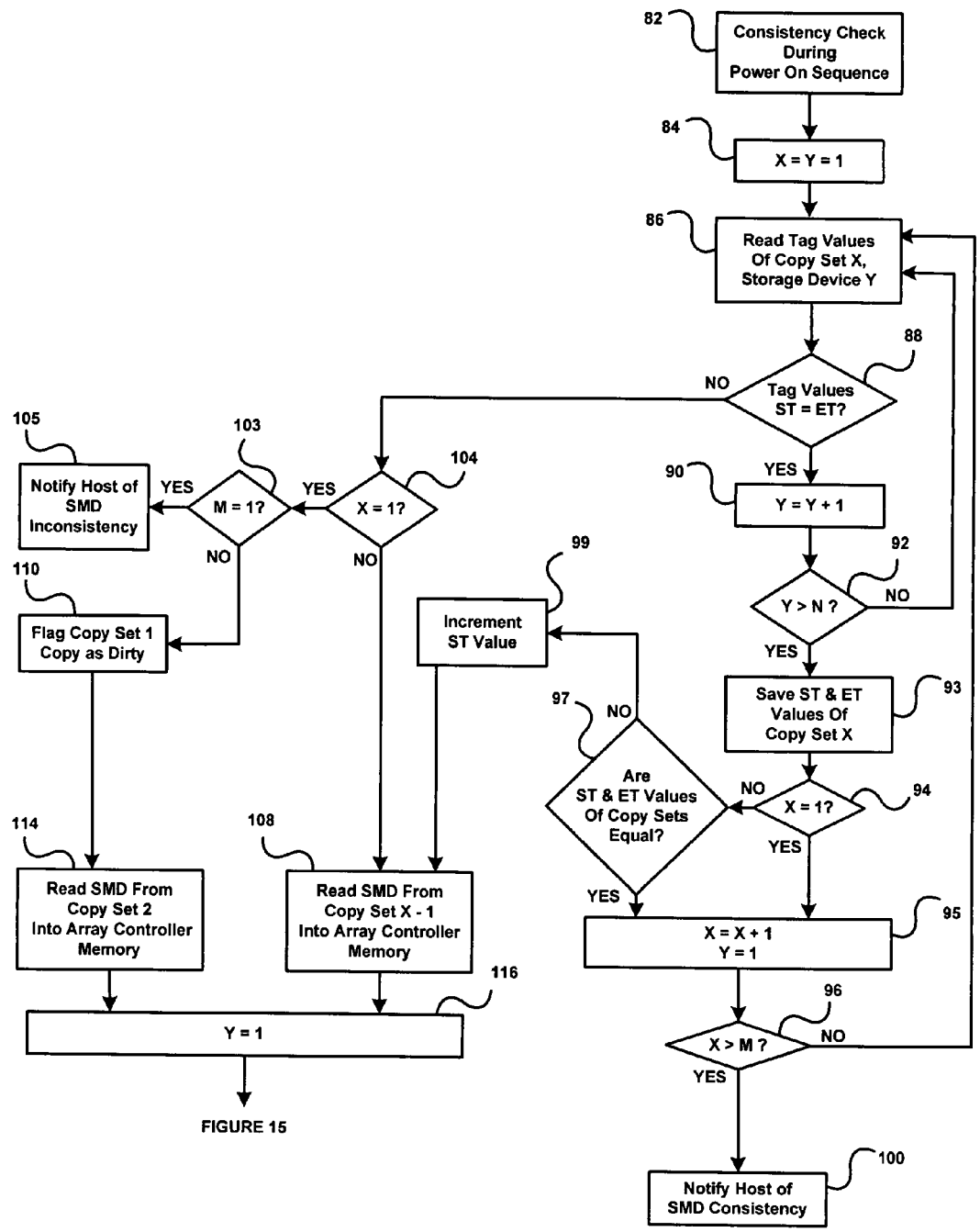
FIG. 17 is a flow chart of a consistency check operation for M copy sets of SMD.

FIG. 17 illustrates a flow chart for testing the consistency of the copy sets shown in FIG. 14. FIG. 14 shows the start tag value equals the end tag value for each SMD copy in the storage devices 1-N. Returning to FIG. 17, in step 82, the consistency check begins with a power on sequence of the data storage subsystem. In step 84, the array controller initializes the variables X and Y, that is, sets the variables: X=1 and Y=1. This starts the routine for copy set 1 at the storage device 1. In step 86, the array controller reads the tag values of storage device 1. In step 88, the array controller tests if the start tag value equals the end tag value. If yes, the array controller changes (e.g., increments) the value of Y in step 90 to test the tag values of the next storage device. In an embodiment, the array controller increments Y=Y+1. In step 92, the array controller tests if Y is greater than N, that is, the value of the last storage device. Since Y=2 so far the array controller returns to step 86. This loop compares the start tag and end tag values until they do not match or Y is greater than N. In step 92 when Y>N, the array controller saves the start tag and end tag values for the copy set in step 93. In step 94, the array controller tests if the routine is in copy set 1. If so, the array controller cannot compare copy set 1 with a prior copy set. In step 95, the array controller increments X, that is, X=2 and initializes Y, that is, Y=1. In step 96, the array controller tests for X>M. Since X=2 the routine returns to step 86. In step 86, the array controller reads the tag values of the storage device 1 in copy set 2. In step 88, the array controller tests if the start tag value equals the end tag value. If yes, the array controller changes the value of Y, for example, increments Y=Y+1 in step 90. In step 92, the array controller tests if the value of Y is greater than N, the value of the last storage device. Since Y=2 the array controller returns to step 86. This loop continues to compare start tag and end tag values until they do not match or until Y is greater than N. In step 92 when Y>N, the start tag and end tag values of copy set 2 will be saved in step 93. In step 94, the array controller tests if the routine is in copy set 1. Since X=2 the routine compares the saved start tag and end tag values of copy set 1 with that of copy set 2. FIG. 14 illustrates the case where the start tag and end tag values of copy set 1 and 2 are the same. Thus in step 95 the array controller increments X and initializes Y. This loop continues up through copy set M until the start tag and end tag values are checked for consistency within all copy sets and between all of the copy sets until complete. In step 100, the host is notified of SMD consistency.

FIGS. 5-17 show that the update and consistency check of the copy sets are performed in ascending order. This does not mean they must proceed in ascending order, but rather the update and consistency check should go in same order for efficiency. Thus, if the SMD update goes from copy set 2, copy set 1 to copy set M, the consistency check should go from copy set 2, copy set 1 to copy set M. The copy sets are therefore referred to as ordered copy sets.

Figure 18:
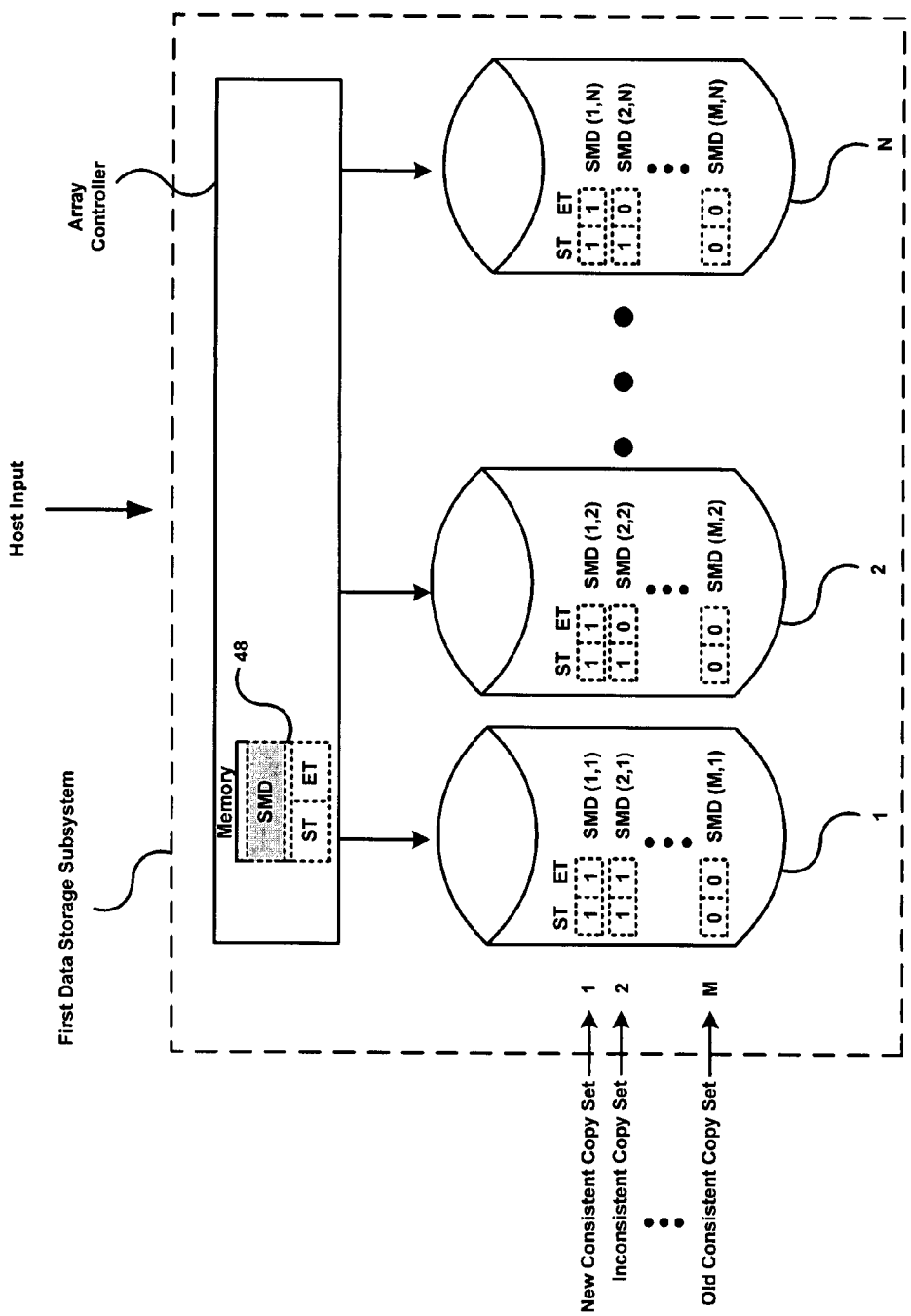
FIG. 18 illustrates the tag value(s) resulting from a failed SMD write operation in copy set 2.

FIG. 18 illustrates an inconsistency in copy set 2. Because the write operation failed at storage device 2, the start tag value will not equal the end tag value in step 88 of FIG. 17. Thus, the array controller performs steps to correct the inconsistent copy set 2. In step 104, the array controller checks if X=1, that is, if the routine is in copy set 1. Since X=2, that is, the routine is in copy set 2 and a new SMD copy is read from copy set 1 to memory 48 in step 108. In step 116, the array controller initializes Y=1. This starts a write tag value(s) routine in step 122 shown in FIG. 15 for copy set 2 at the storage device 1.

Referring to FIG. 15 the array controller writes the tag value(s) (e.g., ST=1 and ET=0) read in step 86 of FIG. 17 to the storage devices 1-N for copy set 2. In an alternative embodiment, the array controller writes the start tag value only (e.g., ST=1). If the tag value(s) are completely written to all storage devices 1-N in step 132, the array controller enters the SMD write routine of FIG. 16. The array controller then writes the SMD across storage devices 1-N for copy set 2. If SMD is completely written to all storage devices 1-N in step 55, the array controller tests if the dirty flag is set in step 56. Since the dirty flag is not set, the array controller changes, e.g., increments the end tag value and writes the tag value(s) across the storage devices 1-N completing the SMD write operation for copy set 2. The SMD write operation continues on the other copy sets as described in connection with copy set M shown in FIGS. 11-13.

Figure 19:
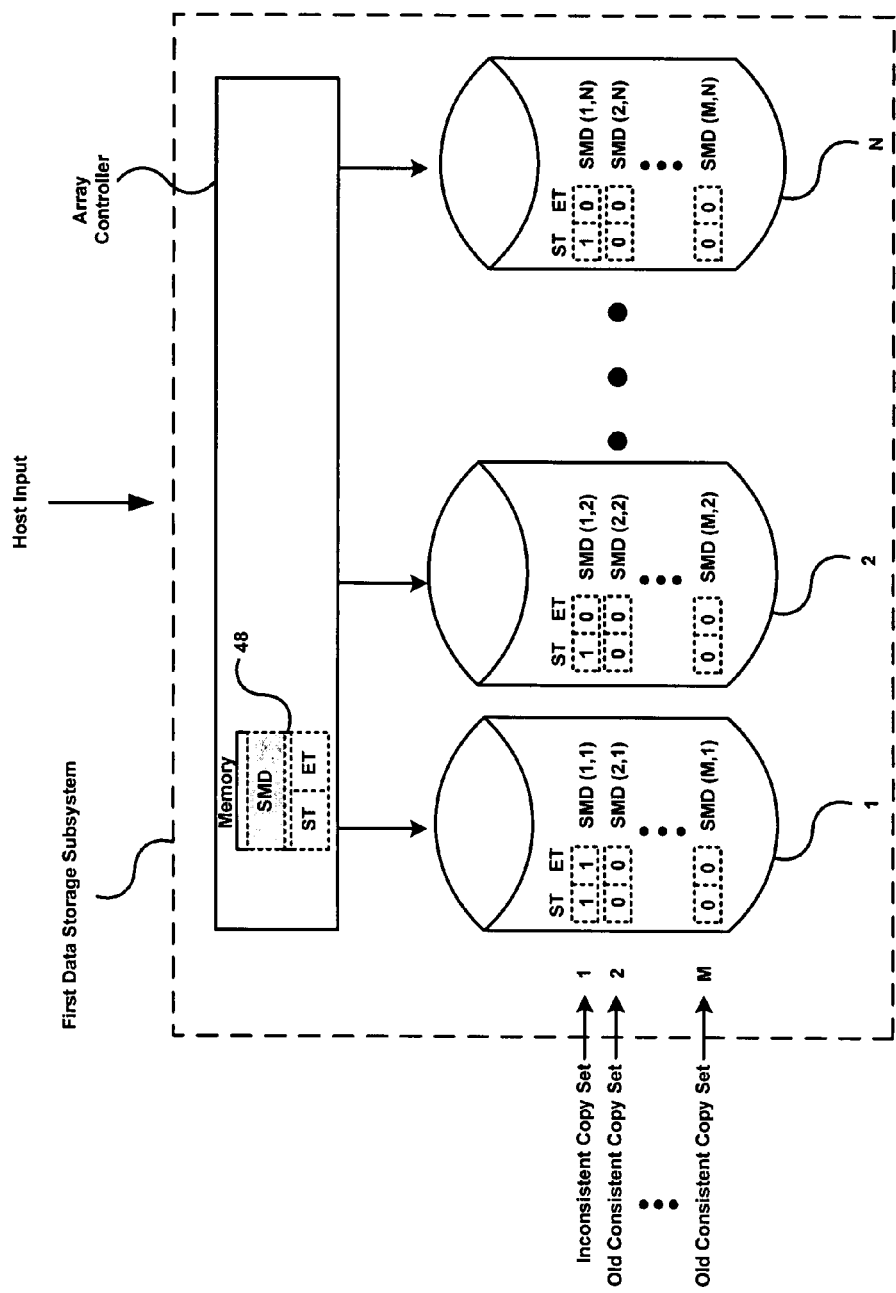
FIG. 19 illustrates the tag value(s) resulting from a failed SMD write operation in copy set 1.

FIG. 19 illustrates an inconsistent copy set 1. Because the write operation failed at storage device 2, the start tag value will not equal the end tag value in step 88 of FIG. 17. In step 104, the array controller checks if X=1, that is, if the routine is in copy set 1. Since X=1, that is, the routine is in copy set 1, the array controller tests in step 103 if M=1, that is, if only one copy set exists. Since M≠1 in step 110, the array controller sets the dirty flag for copy set 1. The dirty flag indicates that a new reliable SMD copy is not available to update inconsistent copy set 1. In step 114, an old SMD copy from copy set 2 is read to the memory 48. In step 116, the array controller initializes Y=1 to start the write tag value(s) routine (step 122 of FIG. 15) at storage device 1 in copy set 1.

Referring to FIG. 15, the array controller writes the tag value(s) (e.g., ST=1 and ET=0 or only ST=1) read in step 86 of FIG. 17 to the storage devices 1-N for copy set 1. If the tag value(s) are completely written to all storage devices 1-N in step 132, the array controller enters the SMD write routine of FIG. 16. The array controller writes the old SMD across the storage devices 1-N for copy set 1. If the old SMD is completely written to the storage devices 1-N in step 55, the array controller tests if the dirty flag is set in step 56. Since the dirty flag is set, the array controller decrements the start tag value (i.e., ST=0) in step 58 and writes the tag value(s) across the storage devices 1-N in steps 60-66, which completes the SMD write operation for copy set 1. When all of the storage devices 1-N complete the tag value write operation in step 68, the array controller clears the dirty flag in step 70. In step 72, the host is notified of SMD consistency.

Figure 20:
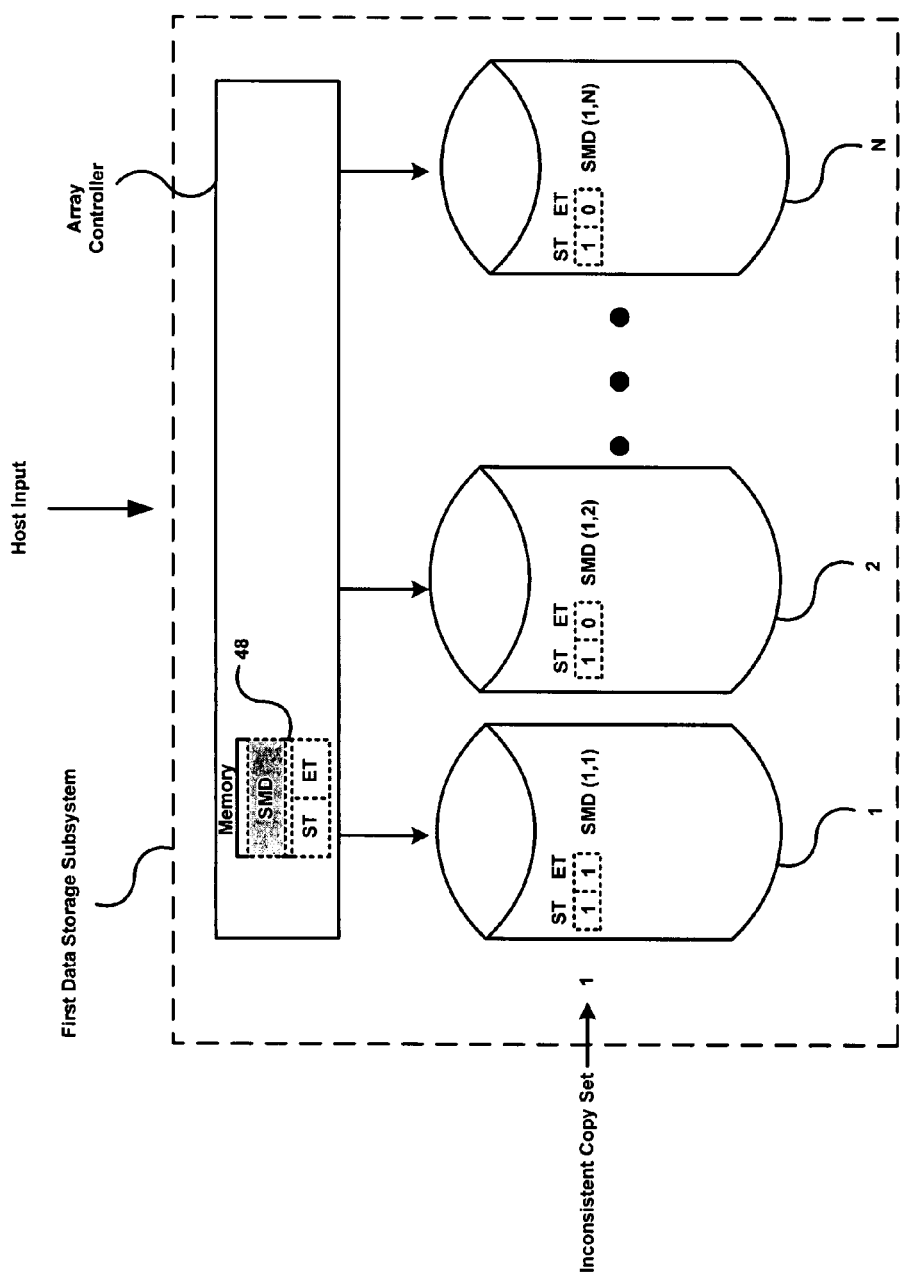
FIG. 20 illustrates the tag value(s) resulting from a failed SMD write operation in a single copy set.

FIG. 20 illustrates the tag values resulting from a failed SMD write operation in a single copy set. Because the write operation failed at storage device 2, the start tag value will not equal the end tag value in step 88 of FIG. 17. In step 104, the array controller checks if X=1, that is, if the routine is in copy set 1. Since X=1 the array controller tests in step 103 if M=1, that is, if only one copy set exists. Since M equals 1 in step 110, the array controller goes to step 105 where the host is notified of the SMD inconsistency, that is, there is no reliable SMD to update copy set 1.

Figure 21:
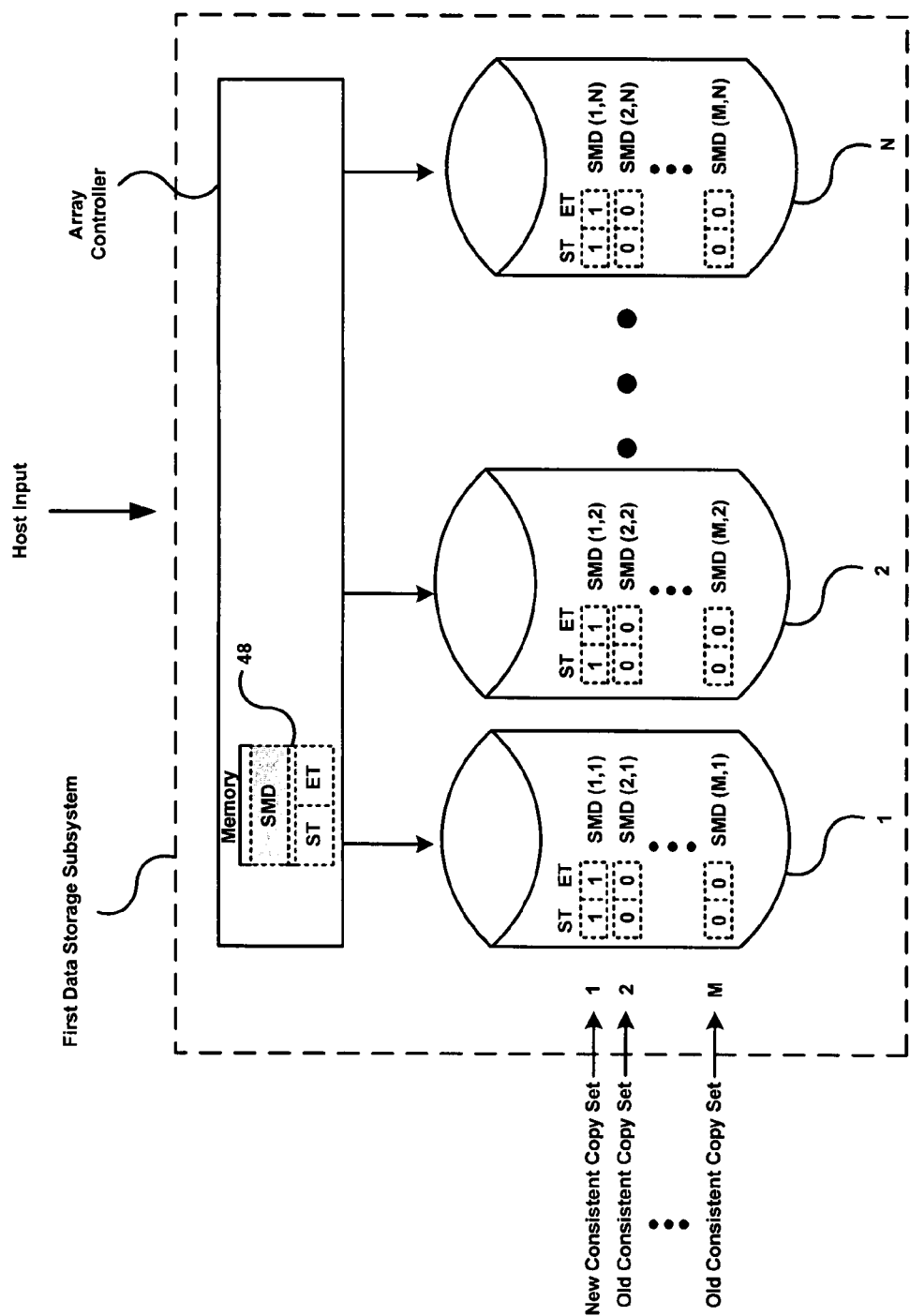
FIG. 21 illustrates the tag value(s) resulting from a failed SMD write operation between copy sets.

FIG. 21 illustrates the tag values from a failed SMD write operation between copy sets. Because the write operation failed before writing copy set 2, the start tag and end tag values of copy set 2 will not equal the start tag and end tag values of copy set 1 in step 97 of FIG. 17. Thus, in step 99, the array controller increments the start tag value of copy set 2, that is, ST=1 and ET remains=0. Since X=2, that is, the routine is in copy set 2, the good SMD copy is read from copy set 1 to memory 48 in step 108. In step 116, the array controller initializes Y=1. This starts a write tag value(s) routine in step 122 of FIG. 15 for copy set 2 at the storage device 1.

Referring to FIG. 15, the array controller writes the tag value(s) to the storage devices 1-N for copy set 2 beginning at step 126. Upon write tag routine completion in step 132 of the write tag value(s) routine, the array controller enters the SMD write routine of FIG. 16. The array controller writes the SMD across storage devices 1-N for copy set 2. Then the array controller increments the end tag value and writes the tag value(s) across the storage devices 1-N completing the SMD write operation for copy set 2. The SMD write operation continues on the copy sets as described in connection with copy set M shown in FIGS. 11-13.

What is claimed:

1. A data storage system coupled to a host, comprising:
    a plurality of storage nodes adapted to be coupled to the host, wherein each storage node includes an array controller coupled to an array of storage devices, wherein each storage device includes one or more copies of the SMD; and
    a system for managing SMD on each storage device, wherein the system for managing the SMD changes a start tag value and an end tag value associated with each copy of SMD in each storage device, wherein the array controller compares the start tag and end tag values to determine consistency of the SMD in the array of storage devices.

2. The data storage system of claim 1, wherein each storage device is a SATA magnetic disk drive having a plurality of copies of the SMD.

3. The data storage system of claim 1, wherein the system for managing the SMD checks for the consistency of the SMD in all of the storage devices and notifies the host of SMD consistency.

4. The data storage system of claim 1, wherein the host manages the SMD on each storage node as a single copy of SMD.

5. The data storage system of claim 1, wherein a plurality of storage nodes are geographically remote to protect the SMD for data recovery in the event of a disaster destroying all of the SMD copies in one of the plurality of the storage nodes.

6. The data storage system of claim 1, wherein a plurality of storage devices contain the SMD for data recovery in the event of a disaster destroying all but one of the plurality of storage devices.

7. A method in an array controller of recovering from an inconsistent copy set in ordered copy sets, comprising:
   (a) comparing the start and end tag values of SMD copies;
   (b) detecting an inconsistent copy set based on mismatched tag values in step (a); and
   (c) rewriting the inconsistent copy set based on a consistent SMD copy from the ordered copy sets or a host.

8. The method of claim 7, further comprising the steps of correcting the copy sets to make the copy sets consistent, and notifying the host that the copy sets are consistent.

9. The method of claim 7, further comprising the step of notifying the host that the copy set is inconsistent.

* * * * *